US007864219B2

(12) United States Patent
Shimauchi et al.

(10) Patent No.: US 7,864,219 B2
(45) Date of Patent: Jan. 4, 2011

(54) VIDEO-SIGNAL LAYERED CODING AND DECODING METHODS, APPARATUSES, AND PROGRAMS WITH SPATIAL-RESOLUTION ENHANCEMENT

(75) Inventors: Kazuhiro Shimauchi, Yokohama (JP); Satoru Sakazume, Yokohama (JP); Toru Kumakura, Yokohama (JP); Motoharu Ueda, Yokohama (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 741 days.

(21) Appl. No.: 11/818,283

(22) Filed: Jun. 14, 2007

(65) Prior Publication Data

US 2007/0291847 A1    Dec. 20, 2007

(30) Foreign Application Priority Data

| Jun. 15, 2006 | (JP) | ............................ 2006-165937 |
| Jun. 15, 2006 | (JP) | ............................ 2006-165938 |
| Apr. 17, 2007 | (JP) | ............................ 2007-108015 |
| Apr. 17, 2007 | (JP) | ............................ 2007-108016 |

(51) Int. Cl.
*H04N 5/228* (2006.01)
(52) U.S. Cl. .............................. 348/222.1; 375/240.16
(58) Field of Classification Search .............. 348/222.1; 375/240.1, 240.3, 240.16; 382/233
See application file for complete search history.

(56) References Cited

U.S. PATENT DOCUMENTS 6,005,623 A * 12/1999 Takahashi et al. ...... 375/240.16

2004/0213345 A1 * 10/2004 Holcomb et al. ....... 375/240.03
2006/0126952 A1 * 6/2006 Suzuki et al. ............... 382/233

FOREIGN PATENT DOCUMENTS

JP        07-162870        6/1995        ................ 7/32

OTHER PUBLICATIONS

Non-patent Document "Image Enhancement by Nonlinear Extrapolation in Frequency Space," Hayit Greenspan et al., IEEE Transactions on Image Processing, vol. 9, No. 6, p. 1035-1048, Jun. 2000.

* cited by examiner

*Primary Examiner*—Gevell Selby
(74) *Attorney, Agent, or Firm*—Renner, Kenner, Greive, Bobak, Taylor & Weber

(57) ABSTRACT

An input video signal is encoded at a plurality of coding layers exhibiting different spatial resolutions. The input video signal is spatially scaled down to a resolution-lowered video signal that exhibits a resolution lower than the video signal. The resolution-lowered video signal is encoded by using a quantization parameter, with a decoding procedure, thus obtaining first coded data and a decoded signal. The decoded signal is spatially scaled up through a high-resolution procedure for controlling high-frequency components estimation depending on the quantization parameter, thus obtaining a high-resolution scaled-up video signal. The input video signal is encoded through inter-spatial resolution prediction using the high-resolution scaled-up video signal as a predictive signal, thus obtaining second coded data that exhibits a resolution higher than the resolution-lowered video signal.

5 Claims, 14 Drawing Sheets

VIDEO-SIGNAL LAYERED CODING AND DECODING METHODS, APPARATUSES, AND PROGRAMS WITH SPATIAL-RESOLUTION ENHANCEMENT

CROSS-REFERENCE TO RELATED APPLICATIONS

This application is based on and claims the benefit of priority from the prior Japanese Patent Application Nos. 2006-165937 filed on Jun. 15, 2006, 2006-165938 filed on Jun. 15, 2006, 2007-108015 filed on Apr. 17, 2007, and 2007-108016 filed on Apr. 17, 2007, the entire content of which is incorporated herein by reference.

BACKGROUND OF THE INVENTION

The present invention relates to video-signal layered coding and decoding methods, apparatuses, and programs.

Several spatial- and temporal resolution and SNR (Signal-to-Noise) scalable video coding schemes have been proposed and employed in a variety of fields. In particular, spatial-domain resolution scalable video coding schemes are most applicable to still and moving pictures.

A known spatial-resolution scalable video coding scheme with two layers of base and enhancement layers is disclosed in, for example, Japanese Un-examined Patent Publication No. 2007-162870. In a coding apparatus, an input video signal having the spatial resolution of the enhancement layer is decimated into a signal having the spatial resolution of the base layer. The decimated signal is then coded at the base layer (base-layer coding), followed by prediction using correlation between the input video signal and a signal having the spatial resolution of the enhancement layer, the signal being given by spatial interpolation of a decoded signal produced in the base-layer coding. A predictive error signal produced in the prediction is coded into a bitstream. The bitstream and other bitstreams produced in the base-layer coding are multiplexed. The multiplexed bitstream is sent to a decoding apparatus and decoded in a reversed fashion.

In the known spatial-resolution scalable video coding scheme, the decoded signal produced in the base-layer coding is interpolated to be used as a predictive signal in enhancement-layer coding. This is because, the input video signal at the enhancement layer and the decoded signal at the base layer have some correlation. In other words, the base-layer decoded signal has some high-frequency components carried by the enhancement-layer input video signal.

In theory, the higher the correlation between the input video signal at the enhancement layer and the decoded signal at the base layer, the higher the coding efficiency. However, in reality, the decoded signal at the base layer has a lower spatial resolution due to decimation of the input video signal, thus not having high-frequency components of the input video signal. A larger quantization step size could give a decoded signal having a lower correlation with the input video signal.

It is thus required to perform an estimation procedure (a spatial-resolution enhancing procedure) so that a predictive signal has a higher correlation with the input video signal in terms of spatial resolution, in addition to interpolation of the base-layer decoded signal.

SUMMARY OF THE INVENTION

A purpose of the present invention is to aim for higher layered coding efficiency with a spatial-resolution enhancing procedure.

The present invention provides a video-signal layered coding apparatus for encoding an input video signal at a plurality of coding layers exhibiting different spatial resolutions, the apparatus comprising at each coding layer: a spatial down-scaler to spatially scale down an input video signal into a resolution-lowered video signal that exhibits a spatial resolution lower than the input video signal; a first encoder to encode the resolution-lowered video signal by using a quantization parameter, with a decoding procedure, thus obtaining first coded data and a decoded signal; a spatial up-scaler to spatially scale up the decoded signal through a high-resolution procedure for controlling high-frequency components estimation depending on the quantization parameter, thus obtaining a high-resolution scaled-up video signal; and a second encoder to encode the input video signal through inter-spatial resolution prediction using the high-resolution scaled-up video signal as a predictive signal, thus obtaining second coded data that exhibits a spatial resolution higher than the resolution-lowered video signal.

Moreover, the present invention provides a video-signal layered coding method of encoding an input video signal at a plurality of coding layers exhibiting different spatial resolutions, the method comprising at each coding layer: a spatial down-scaling step of spatially scaling down an input video signal into a resolution-lowered video signal that exhibits a spatial resolution lower than the video signal; a first encoding step of encoding the resolution-lowered video signal by using a quantization parameter, with a decoding procedure, thus obtaining first coded data and a decoded signal; a spatial up-scaling step of spatially scaling up the decoded signal through a high-resolution procedure for controlling high-frequency components estimation depending on the quantization parameter, thus obtaining a high-resolution scaled-up video signal; and a second encoding step of encoding the input video signal through inter-spatial resolution prediction using the high-resolution scaled-up video signal as a predictive signal, thus obtaining second coded data that exhibits a spatial resolution higher than the resolution-lowered video signal.

Furthermore, the present invention provides a video-signal layered coding program, in a computer readable medium, for encoding an input video signal at a plurality of coding layers exhibiting different spatial resolutions, the program comprising at each coding layer: a spatial down-scaling program code of spatially scaling down an input video signal into a resolution-lowered video signal that exhibits a spatial resolution lower than the input video signal; a first encoding program code of encoding the resolution-lowered video signal by using a quantization parameter, with a decoding procedure, thus obtaining first coded data and a decoded signal; a spatial up-scaling program code of spatially scaling up the decoded signal through a high-resolution procedure for controlling high-frequency components estimation depending on the quantization parameter, thus obtaining a high-resolution scaled-up video signal; and a second encoding program code of encoding the input video signal through inter-spatial resolution prediction using the high-resolution scaled-up video signal as a predictive signal, thus obtaining second coded data that exhibits a spatial resolution higher than the resolution-lowered video signal.

Moreover, the present invention provides a video-signal layered decoding apparatus for decoding an input bitsteam at a plurality of decoding layers exhibiting different spatial resolutions, the apparatus comprising at each decoding layer: a separator to separate an input bitsteam into first coded data, second coded data and a coded quantization parameter, the first coded data being an encoded version of a resolution-lowered video signal exhibiting a spatial resolution lower than an original video signal and obtained by spatially scaling down the original video signal, the second coded data being an encoded version of the original video signal obtained through inter-spatial resolution prediction using a high-resolution scaled-up video signal as a predictive signal and exhibiting a spatial resolution higher than the resolution-lowered video signal, the high-resolution scaled-up video signal being obtained by spatially scaling up a decoded signal through a high-resolution procedure based on the quantization parameter, the decoded signal being obtained through a decoding procedure to the resolution-lowered video signal, the quantization parameter being used in encoding the resolution-lowered video signal; a first decoder to decode the coded quantization parameter and decode the separated first coded data using the quantization parameter thus decoded to obtain the resolution-lowered video signal; a reconstructor to spatially scale up the resolution-lowered video signal to reconstruct the high-resolution scaled-up video signal based on the quantization parameter thus decoded; and a second decoder to decode the separated second coded data through inter-spatial resolution prediction using the reconstructed high-resolution scaled-up video signal as a predictive signal, thus obtaining a reproduced video signal of the same high spatial resolution as the input original video signal.

Furthermore, the present invention provides a video-signal layered decoding method of decoding an input bitsteam at a plurality of decoding layers exhibiting different spatial resolutions, the method comprising at each decoding layer: a separating step of separating an input bitsteam into first coded data, second coded data and a coded quantization parameter, the first coded data being an encoded version of a resolution-lowered video signal exhibiting a spatial resolution lower than an original video signal and obtained by spatially scaling down the original video signal, the second coded data being an encoded version of the original video signal obtained through inter-spatial resolution prediction using a high-resolution scaled-up video signal as a predictive signal and exhibiting a spatial resolution higher than the resolution-lowered video signal, the high-resolution scaled-up video signal being obtained by spatially scaling up a decoded signal through a high-resolution procedure based on the quantization parameter, the decoded signal being obtained through a decoding procedure to the resolution-lowered video signal, the quantization parameter being used in encoding the resolution-lowered video signal; a first decoding step of decoding the coded quantization parameter and decode the separated first coded data using the quantization parameter thus decoded to obtain the resolution-lowered video signal; a reconstructing step of spatially scaling up the resolution-lowered video signal to reconstruct the high-resolution scaled-up video signal based on the quantization parameter thus decoded; and a second decoding step of decoding the separated second coded data through inter-spatial resolution prediction using the reconstructed high-resolution scaled-up video signal as a predictive signal, thus obtaining a reproduced video signal of the same high spatial resolution as the input original video signal.

Still, furthermore, the present invention provides a video-signal layered decoding program, in a computer readable medium, for decoding an input bitsteam at a plurality of decoding layers exhibiting different spatial resolutions, the program comprising at each decoding layer: a separating program code of separating an input bitsteam into first coded data, second coded data and a coded quantization parameter, the first coded data being an encoded version of a resolution-lowered video signal exhibiting a spatial resolution lower than an original video signal and obtained by spatially scaling down the original video signal, the second coded data being an encoded version of the original video signal obtained through inter-spatial resolution prediction using a high-resolution scaled-up video signal as a predictive signal and exhibiting a resolution higher than the resolution-lowered video signal, the high-resolution scaled-up video signal being obtained by spatially scaling up a decoded signal through a high-resolution procedure based on the quantization parameter, the decoded signal being obtained through a decoding procedure to the resolution-lowered video signal, the quantization parameter being used in encoding the resolution-lowered video signal; a first decoding program code of decoding the coded quantization parameter and decode the separated first coded data using the quantization parameter thus decoded to obtain the resolution-lowered video signal; a reconstructing program code of spatially scaling up the resolution-lowered video signal to reconstruct the high-resolution scaled-up video signal based on the quantization parameter thus decoded; and a second decoding code of decoding the separated second coded data through inter-spatial resolution prediction using the reconstructed high-resolution scaled-up video signal as a predictive signal, thus obtaining a reproduced video signal of the same high spatial resolution as the input original video signal.

DETAILED DESCRIPTION OF PREFERRED EMBODIMENTS

Several preferred embodiments according to the present invention will be described in detail with reference to the drawings.

The same reference signs and numerals are used for the same or analogous components throughout the drawings in the following disclosure.

There are two basic aspects of the present invention: higher prediction efficiency by estimation in layered coding or decoding; and higher correlation between an enhancement-layer input original video signal and a base-layer decoded signal in terms of spatial resolution based on the coding characteristics for the decoded signal produced in encoding a video signal that has a lower resolution than the input original video signal and gained by converting the input original video into a lower layer than the enhancement layer.

The following embodiments focus on two-layer coding or decoding at the enhancement and base layers. The present invention is, however, applicable to multilayer coding or decoding at a plurality of coding or decoding layers exhibiting different spatial resolutions.

Figure 1:
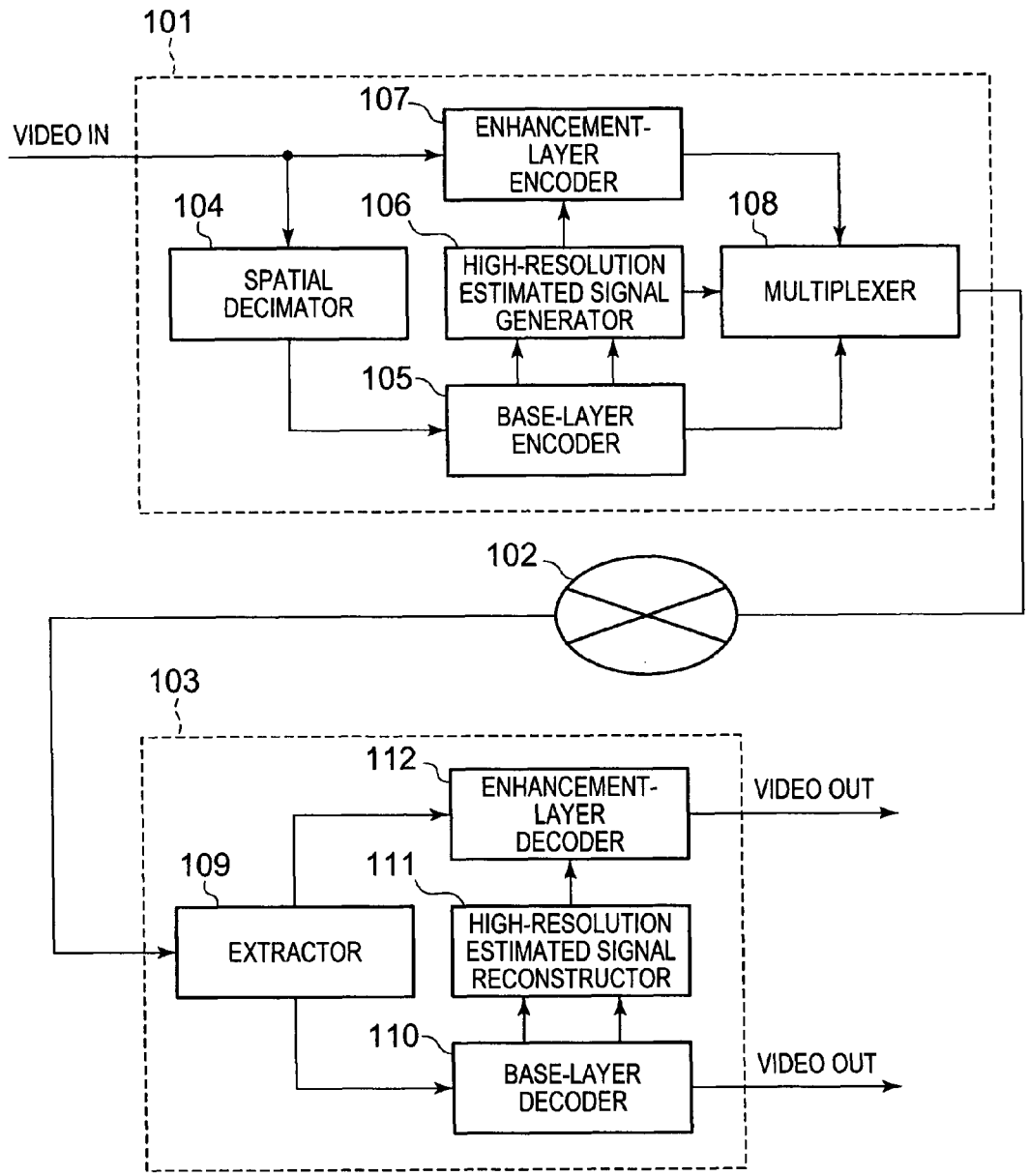
FIG. 1 shows block diagrams of a layered coding apparatus and a layered decoding apparatus, preferred embodiments according to the present invention.

Shown in FIG. 1 are block diagrams of a layered coding apparatus 101 and a layered decoding apparatus 103, for achieving higher spatial resolution scalable coding efficiency.

The layered coding apparatus 101 is electrically connected to the layered decoding apparatus 103 via a network 102, such as, a telephone network and a communications network, which may be wired or wireless. Any storage medium, such as, a DVD and a memory can also be used instead of the network 102.

Input to the layered coding apparatus 101 is a video signal. The video signal is subjected to a coding procedure at the coding apparatus 101. The video signal input to the coding apparatus 101 and subjected to the coding procedure is referred to as an input original video signal hereinafter.

Output from the layered coding apparatus 101 is a bitstream which is then supplied to the layered decoding apparatus 103 via the network 102. Data necessary for a decoding procedure are extracted from the bitstream and subjected to the decoding procedure at the decoding apparatus 103. A decoded video signal is output from the apparatus 103 at a spatial resolution suitable for a display apparatus (not shown).

The layered coding apparatus 101 is equipped with, at least, a spatial decimator 104 (a spatial down-scaler), a base-layer encoder (a first encoder) 105, a high-resolution estimated signal generator (a spatial up-scaler) 106, an enhancement-layer encoder (a second encoder) 107, and a multiplexer 108.

The spatial decimator 104 receives an input original video signal and spatially decimates it at a desired lower spatial resolution, thus producing a base-layer signal decimated at the desired lower spatial resolution (a resolution-lowered video signal). Although there are several ways of spatial decimation, a recommended is compatible with filtering performed at the high-resolution estimated signal generator 106, based on Laplacian pyramid, which will be discussed later, and with arbitrary down scalability. The base-layer signal is then supplied to the base-layer encoder 105.

The base-layer encoder 105 encodes the base-layer signal, thus generating a bitstream (first coded data) which is then supplied to the multiplexer 108. The base-layer encoder 105 may be an MPEG-2 or H.264 closed-loop encoder. Such an encoder may have a function of temporal scalability, S/N-ratio scalability, etc. The base-layer encoder 105 also generates a base-layer decoded signal which is supplied to the high-resolution estimated signal generator 106. Also supplied to the generator 106 is a quantization parameter used in controlling the quantization step size in the base-layer encoding.

Figure 4:
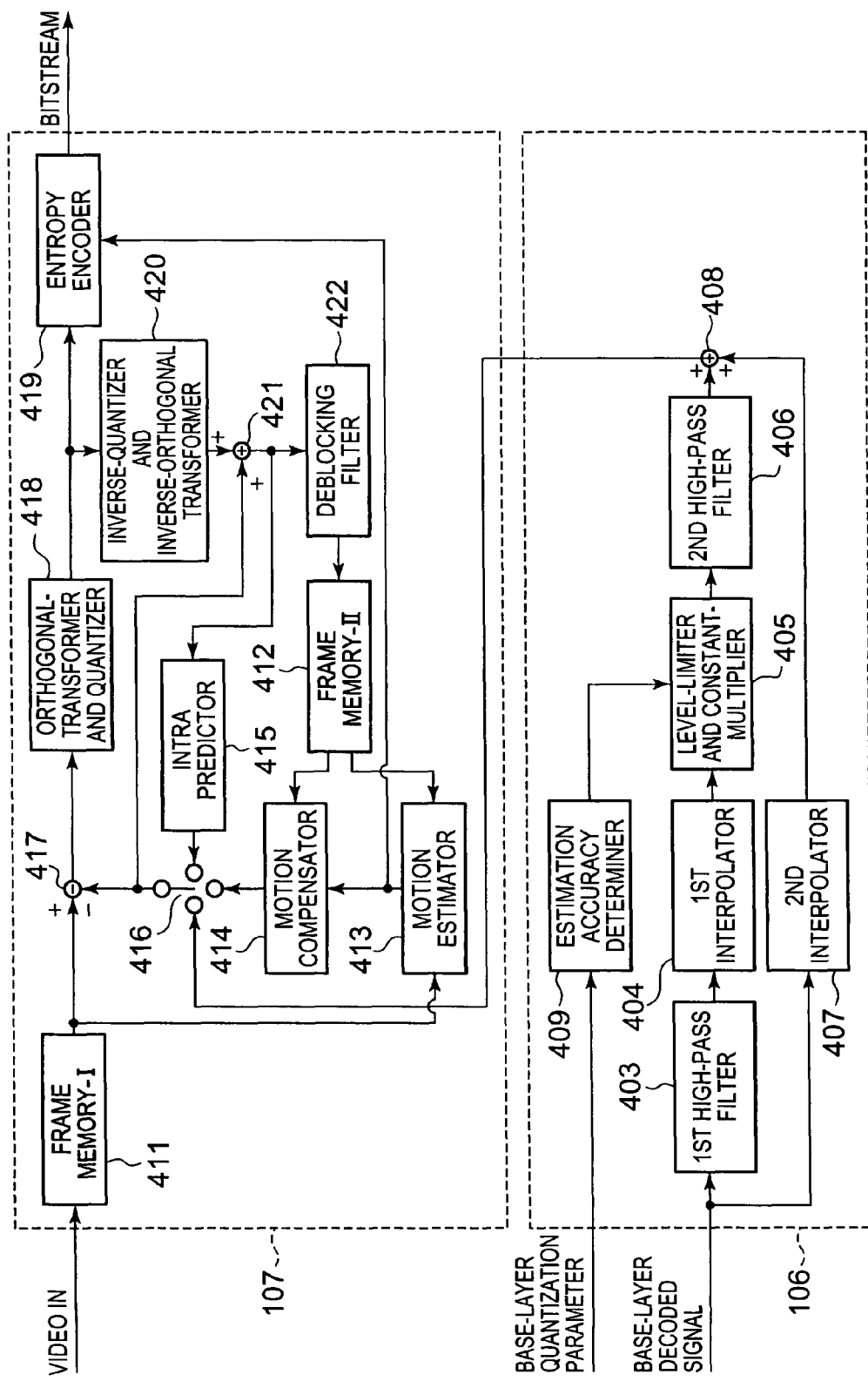
FIG. 4 shows block diagrams of a high-resolution estimated signal generator and an enhancement-layer encoder of the layered coding apparatus shown in FIG. 1.

When an open-loop encoder is employed for the base-layer encoder 105, it has a function of decoding (reconstruction). When a closed-loop encoder is employed for the encoder 105, its circuit configuration (although not shown) can be achieved similar to the enhancement-layer encoder 107, such as shown in FIG. 4, which will be described later in detail. In the closed-loop type, supplied to a frame memory (corresponding to the counterpart 2 in FIG. 4) is a base-layer video signal given by decimating the input original video signal at the spatial decimator 104 while supplied to a predictive-signal selector (corresponding to the counterpart 416 in FIG. 4) is not a signal from the high-resolution estimated signal generator 106 but a predictive signal either from an intra predictor (corresponding to the counterpart 415 in FIG. 4) or a motion compensator (corresponding to the counterpart 414 in FIG. 4).

The high-resolution estimated signal generator 106 receives the base-layer decoded signal and the quantization parameter from the base-layer encoder 105. The generator 106 has a function of estimating a video signal of the same high resolution as the input original video signal, from the base-layer decoded signal, with spatial interpolation (spatial up-scaling), thus producing a high-resolution estimated signal (a high-resolution scaled-up signal). The estimation will be described later in detail. The estimated signal is then supplied to the enhancement-layer encoder 107.

The enhancement-layer encoder 107 receives the input original video signal and the high-resolution estimated signal. The encoder 107 performs prediction using these signals based on correlation in space (intra prediction), inter-spatial resolution and temporal, and encodes a resultant predictive error signal, thus producing a bitstream. These procedures will be described later in detail. The bitstream is then supplied to the multiplexer 108.

Figure 11:
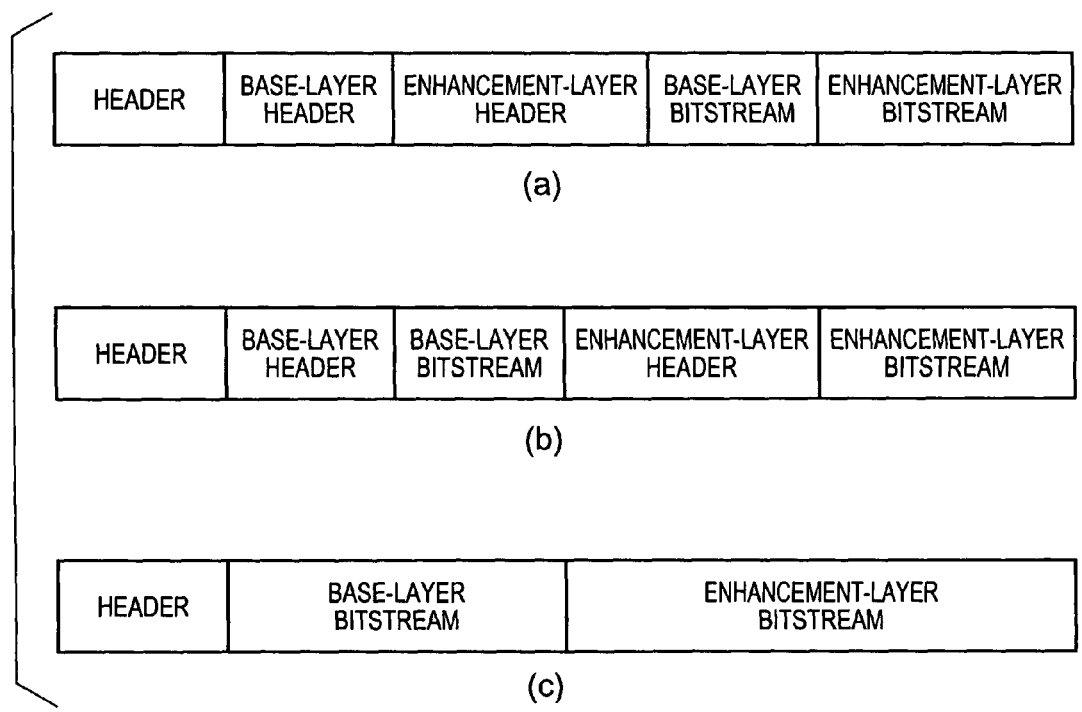
FIG. 11 exemplary shows three types of format for a multiplexed bitstream generated by the layered coding apparatus and method shown in FIGS. 1 and 2, respectively.

The multiplexer 108 receives the bitstreams from the base-layer encoder 105 and the enhancement-layer encoder 107, and multiplexes them into a multiplexed bitstream, such as illustrated in FIG. 11, which will be described later in detail. The multiplexed bitstream is output, for example, to the network 102.

Disclosed next is the layered decoding apparatus 103 shown in FIG. 1. The apparatus 103 is equipped with, at least, an extractor (a separator) 109, a base-layer decoder (a first decoder) 110, a high-resolution estimated signal reconstructor 111, and an enhancement-layer decoder 112 (a second decoder).

The extractor 109 receives the multiplexed bistream, such as illustrated in FIG. 11, output from the layered coding apparatus 101. Not only from the apparatus 101, the layered decoding apparatus 103 can receive such a multiplexed bitstream from any source. The extractor 109 demultiplexes the multiplexed bistream, extracts a base-layer bitstream and other bitstreams depending on the performance of the apparatus 103 or a display apparatus (not shown), and outputs the bitstreams to the base-layer decoder 110 and the enhancement-layer decoder 112, respectively.

The base-layer decoder 110 decodes the base-layer bitstream supplied from the extractor 109, thus generating a base-layer decoded signal. The base-layer decoded video signal is then supplied to the high-resolution estimated signal reconstructor 111 and, if necessary, to a display apparatus (not shown). Also supplied to the reconstructor 111 is a quantization parameter used in the base-layer decoding. The base-layer decoder 110 may be an MPEG-2- or H.264-type decoder. It may also have a function of temporal scalability, S/N-ratio scalability, etc.

The high-resolution estimated signal reconstructor 111 receives the base-layer decoded signal and the quantization parameter supplied from the base-layer decoder 110. The reconstructor 111 reconstructs the high-resolution estimated signal from the base-layer decoded signal by using the quantization parameter. The procedure will be described later in detail. The reconstructed high-resolution estimated signal is then supplied to the enhancement-layer decoder 112.

The enhancement-layer decoder 112 receives the bitstream and the high-resolution estimated signal supplied from the extractor 109 and the high-resolution estimated signal reconstructor 111, respectively. The decoder 112 decodes the bitstream to gain a decoded signal and reproduce a video signal of the same high resolution as the input original video signal by using the decoded signal and the high-resolution estimated signal. The reproduced video signal is then supplied to a display apparatus or the like.

Figure 2:
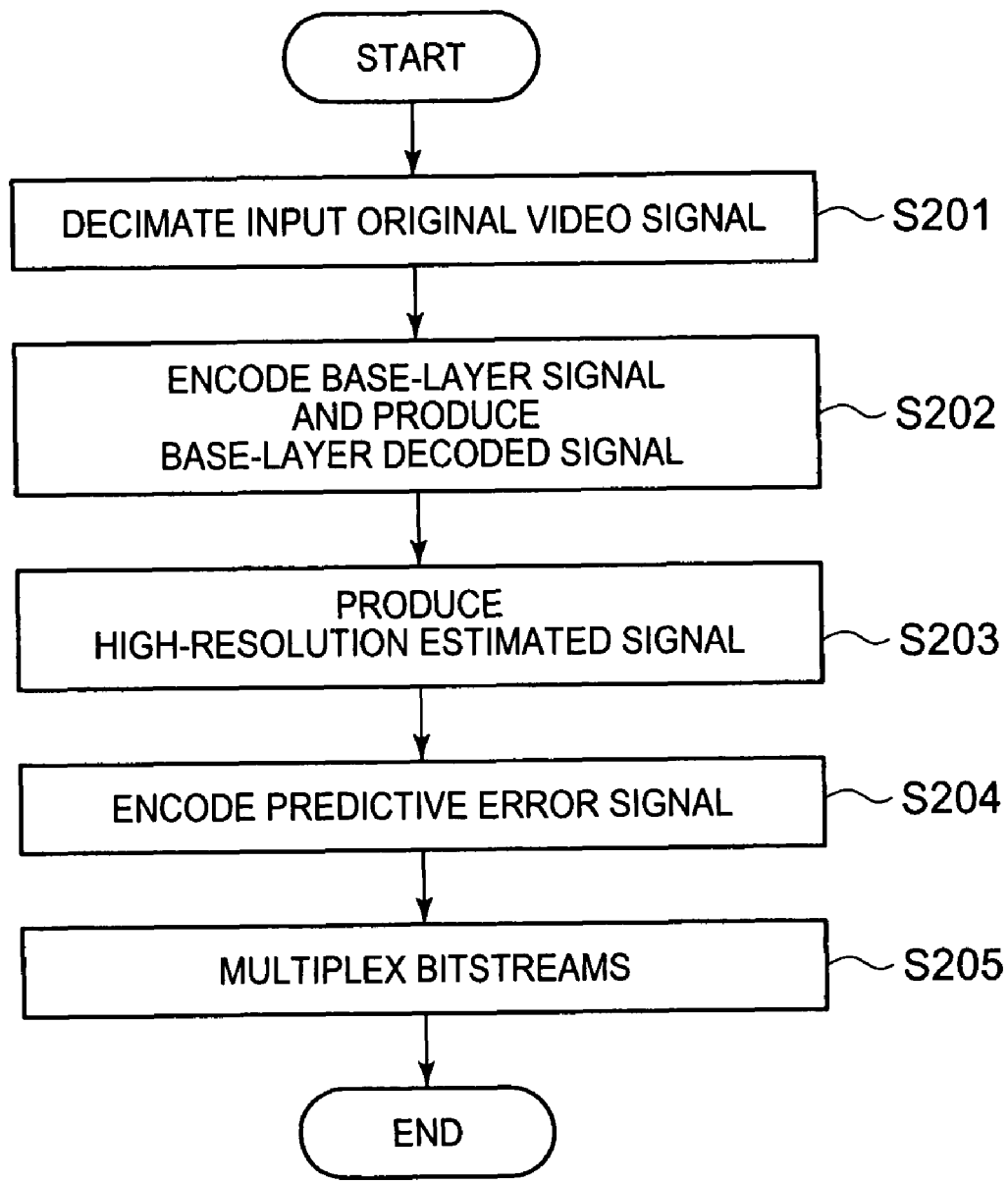
FIG. 2 shows a flowchart of a layered coding procedure that corresponds to the functions of the layered coding apparatus shown in FIG. 1.

Described next with reference to FIG. 2 is a layered coding procedure for achieving higher spatial resolution scalable coding efficiency that corresponds to the several functions of the layered coding apparatus 101 shown in FIG. 1.

An input original video signal is spatially decimated at a desired lower spatial resolution to produce a base-layer signal decimated at the desired lower spatial resolution (step S201). The base-layer signal is encoded by base-layer encoding to produce a base-layer bitstream and also decoded to produce a base-layer decoded signal (step S202).

A video signal of the same high resolution as the input original video signal is estimated from the base-layer decoded signal, with a quantization parameter used in the base-layer encoding, to produce a high-resolution estimated signal (step S203).

Prediction is performed using the input original video signal and the high-resolution estimated signal based on correlation in space (intra prediction), inter-spatial resolution and temporal, and a resultant predictive error signal is encoded to produce an enhancement-layer bitstream (step S204).

The bitstreams at the enhancement and base layers are multiplexed into a multiplexed bitstream (step S205).

Figure 3:
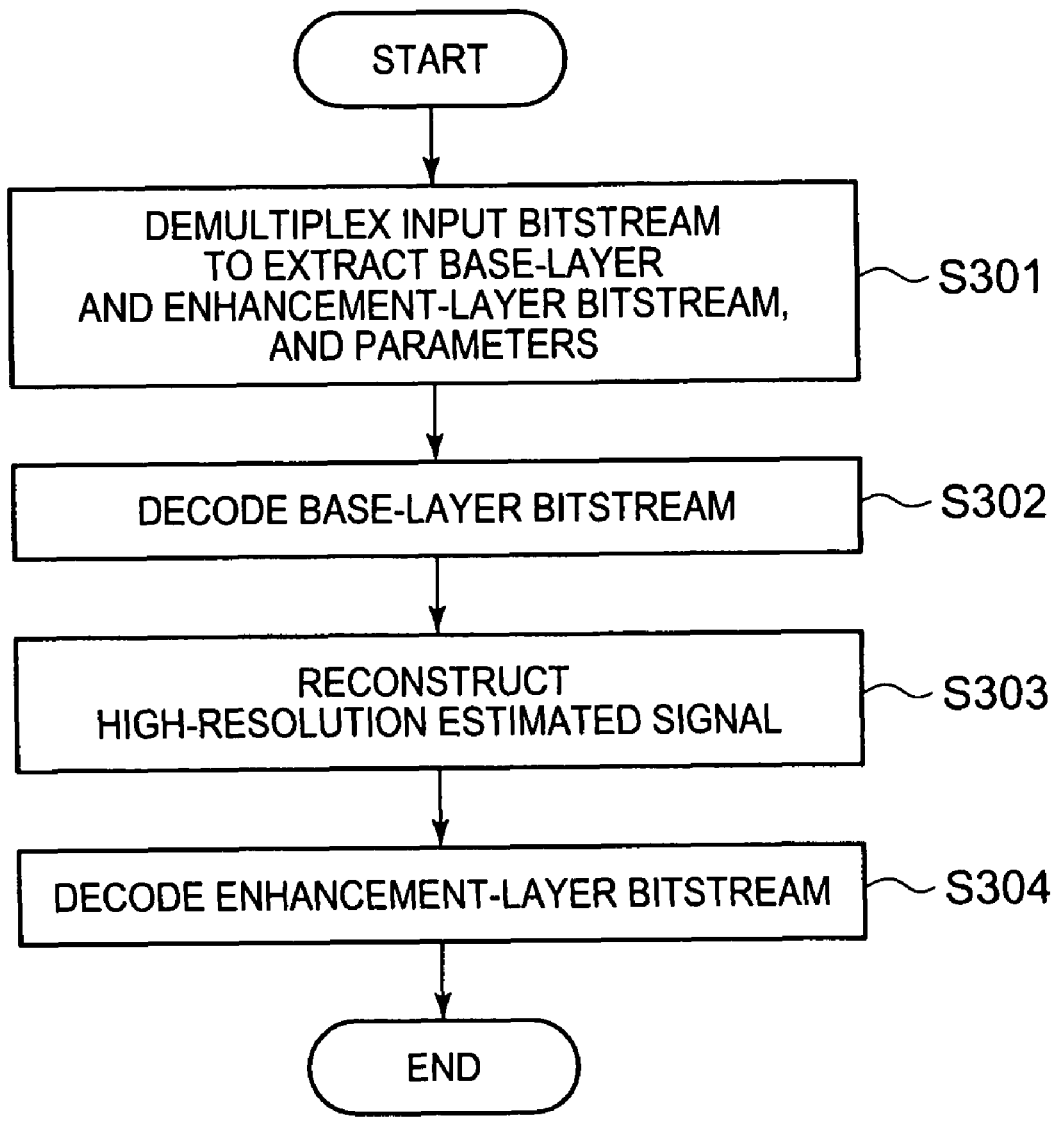
FIG. 3 shows a flowchart of a layered decoding procedure that corresponds to the functions of the layered decoding apparatus shown in FIG. 1.

Described next with reference to FIG. 3 is a layered decoding procedure for achieving higher spatial resolution scalable coding efficiency that corresponds to the several functions of the layered decoding apparatus 103 shown in FIG. 1.

A multiplexed bistream produced as above is demultiplexed to extract a base-layer bitstream and an enhancement-layer bitstream (step S301).

The base-layer bitstream is decoded by base-layer deciding to produce a base-layer decoded signal (step S302). The high-resolution estimated signal is reconstructed from the base-layer decoded signal with a quantization parameter used in the base-layer decoding (step S303).

The enhancement-layer bitstream is decoded to gain a decoded signal and reproduce a video signal of the same high resolution as the input original video signal by using the decoded signal and the high-resolution estimated signal (step S304).

FIG. 4 shows exemplary block diagrams of the high-resolution estimated signal generator 106 and the enhancement-layer encoder 107 of the layered coding apparatus 101.

The high-resolution estimated signal generator 106 is equipped with, at least, a first high-pass filter 403, a first interpolator 404, a level-limiter and constant-multiplier 405, a second high-pass filter 406, a second interpolator 407, a signal composer (or adder) 408, and an estimation accuracy determiner 409.

The first high-pass filter 403 receives the base-layer decoded signal supplied from the base-layer encoder 105 (FIG. 1) and extracts Laplacian components as high-frequency components, for example, according to the expressions (1) and (2) shown below.

Image enlargement with prediction of high-frequency components employing the expressions (1) and (2) and also expressions (3) to (8), which will be discussed later, are taught from the description of the document "An Arbitrary Scale Image Enlargement Method with the Prediction of High-Frequency Components" published by the Institute of Electronics, Information and Communication Engineers, Vol. 384-A, No. 9, pp. 1192-1201, September 2001, the entire content of which is incorporated herein by reference. Those expressions are also taught from the description of the document "Image Enhancement By Nonlinear Extrapolation in Frequency Space" published in IEEE Transactions on Image Processing, Vol. 9, No. 6, June 2000, the entire content of which is incorporated herein by reference.

Laplacian components $L_o(x)$ extracted from an input signal $G_o(x)$ can, for example, be given as follows:

$$L_o(x) = G_o(x) - \sum_{i=-I}^{I} W(i) \cdot G_o(x+i) \quad (1)$$

$$W(i) = \frac{1}{2\sqrt{\rho\pi}} e^{-\frac{i^2}{4\rho}} \quad (2)$$

The letters "I" and "ρ" in the expressions (1) and (2) are the number of filter taps and a parameter for use in adjustments to a bandwidth of a Gaussion filter, respectively.

One preferable requirement for the first high-pass filter 403 is that the filter coefficients and interpolation function, etc., of the filter 403 satisfy the pyramid structure with those of the spatial decimator 104 (FIG. 1), the first interpolator 404, the second high-pass filter 406, and the second interpolator 407. For example, when a sync function is applied to the spatial decimator 104, the pyramid structure is achieved by applying the same sync function to the first interpolator 404, the second high-pass filter 406, and the second interpolator 407.

The high-frequency components extracted by the first high-pass filter 403 is then supplied to the first interpolator 404. The interpolator 404 applies an interpolation procedure to the extracted Laplacian components (the high-frequency components) so that the components exhibit the spatial resolution the same as the enhancement-layer input original video signal, at a scale-up (enlargement) factor "r" (resolution at the enhancement layer/resolution at the base layer) that is the reciprocal of a scale-down factor at the spatial decimator 104 (FIG. 1), for example, according to the expressions (3), (4) and (5) shown below.

A signal $(\text{EXPAND})_r L_o(x)$ for which the input Laplacian components $L_o(x)$ is interpolated at the scale-up factor "r" is given as follows:

$$(\text{EXPAND})_r L_o(x) = \sum_{i=-l}^{l} w_r(i) L_o\left(int\left(\frac{x}{2^r}\right) + i\right) \quad (3)$$

$$W_r(i) = \frac{3}{4} e^{-\frac{9\pi}{16}(\Delta k + i)^2} \quad (4)$$

$$\Delta k = int\left(\frac{x}{2^r}\right) - \frac{x}{2^r} \quad (5)$$

The letter "l" in the expression (3) is the number of filter taps. The sign "int(•)" in the expressions (3) and (5) indicates an integer extraction procedure. The filter coefficients and interpolation function, etc., may be different from those in the expressions (3) to (5).

The interpolated signal is supplied from the first interpolator 404 to the level-limiter and constant-multiplier 405.

The limiter and multiplier 405 performs a level-limiting and constant-multiplication procedure that is a first step of estimating unknown high-frequency components, for example, according to the following expression, to the input signal $(\text{EXPAND})_r L_o(x)$:

$$\overline{L}_r(x) = \alpha_r \times \begin{cases} T & \text{if } T \leq (\text{EXPAND})_r L_o(x) \\ (\text{EXPAND})_r L_o(x) & \text{if } -T < (\text{EXPAND})_r L_o(x) < T \\ -T & \text{if } (\text{EXPAND})_r L_o(x) \leq -T \end{cases} \quad (6)$$

Parameters T and $\alpha_r$ for the level limitation and constant multiplication, respectively, shown in the expression (6) are given to the level-limiter and constant-multiplier 405 from the estimation accuracy determiner 409, in this embodiment, for higher estimation accuracy which depends on the scale-up factor "r" and quantization at the base layer.

A level-limited and constant-multiplied signal is supplied from the level-limiter and constant-multiplier 405 to the second high-pass filter 406. The filter 406 performs a high-pass filtering procedure that is a second step of estimating unknown high-frequency components, for example, according to the following expression:

$$\hat{L}_r(x) = \overline{L}_r(x) - \sum_{i=-l}^{l} W(i) \cdot \overline{L}_r(x + i) \quad (7)$$

The term W(i) in the expression (7) is given from the expression (2).

The second high-pass filter 406 supplies the estimated high-frequency components to the signal composer 408.

In FIG. 4, the base-layer decoded signal supplied from the base-layer encoder 105 (FIG. 1) is given not only to the first high-pass filter 403 but also to the second interpolator 407. The interpolator 407 applies an interpolation procedure to the base-layer decoded signal so that the signal exhibits the spatial resolution the same as the input original video signal, at a scale-up factor "r" (resolution at the enhancement layer/resolution at the base layer), for example, according to the following expression:

A signal $(\text{EXPAND})_r G_o(x)$ for which the input base-layer decoded signal $G_o(x)$ is interpolated at the scale-up factor "r" is given as follows:

$$(\text{EXPAND})_r G_0(x) = \sum_{i=-l}^{l} W_r(i) \cdot G_0\left(int\left(\frac{x}{2^r}\right) + i\right) \quad (8)$$

The term $W_r(i)$ in the expression (8) is given from the expressions (4) and (5). The filter coefficients and interpolation function, etc., may be different from those in the expression (8).

The second interpolator 406 supplies an interpolated signal to the signal composer 408 (or adder).

The signal composer 408 combines the estimated high-frequency components from the second high-pass filter 406 with the interpolated signal from the second interpolator 406 (or adds the components and the signal) to gain a high-resolution estimated signal.

The estimation accuracy determiner 409 receives the quantization parameter, from the base-layer encoder 105, used in controlling the quantization step size in the base-layer encoding, to decide the parameters T and ar used in the expression (6) for high high-frequency estimation accuracy.

The high-frequency estimation accuracy depends on quantization at the base-layer encoder 105, as discussed above. A larger quantization parameter produce a lower-quality base-layer decoded signal, which causes lower high-frequency estimation accuracy, thus resulting in lower coding efficiency.

Preset in the estimation accuracy determiner 409 for the reason above are several best matches between the quantization parameter for the base-layer encoding and estimation parameters that are the parameters T and $\alpha_r$ for the level limitation and constant multiplication, respectively. The determiner 409 converts the input quantization parameter into the estimation parameters.

Figure 10:
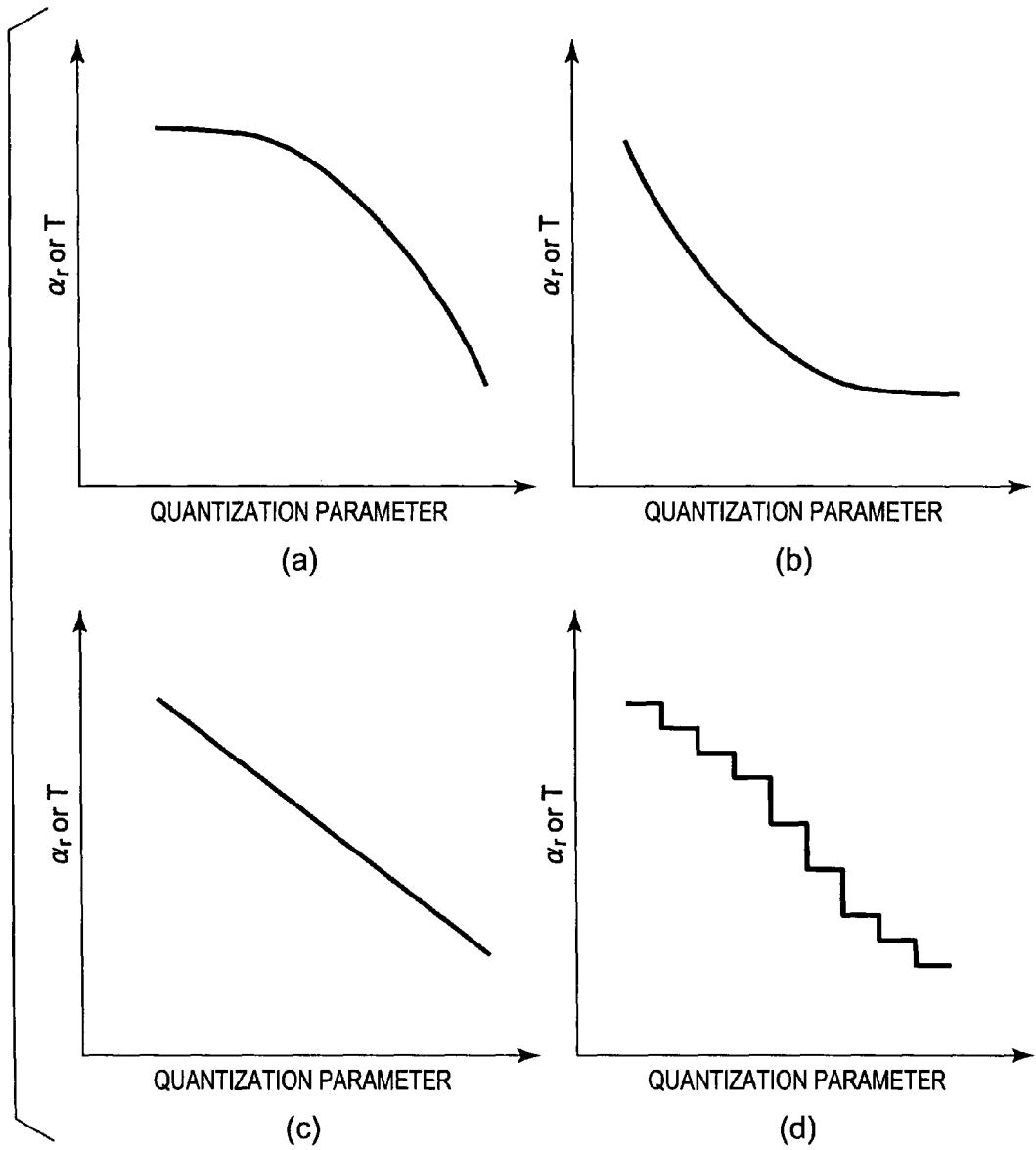
FIG. 10 shows some examples of matches between a base-layer quantization parameter and estimation parameters (T and $\alpha_r$) used in the high-resolution estimated signal generator and reconstructor, and their corresponding procedures shown in FIGS. 4, 5, 7 and 8, respectively.

FIG. 10 shows some examples of matches between the base-layer quantization parameter and the estimation parameters (T and $\alpha_r$). Shown in FIG. 10 is that the larger the quantization parameter, the smaller the estimation parameters.

Smaller estimation parameters prevent high-frequency components from being amplified at the level-limiter and constant-multiplier 405, which could otherwise cause a poor encoding performance, thus maintaining high coding efficiency which could otherwise be lowered due to erroneous estimation because of the poor encoding performance.

Such matches between the base-layer quantization parameter and the estimation parameters (T and $\alpha_r$) can be expressed in a quadratic curve such as shown in (a) and (b) of FIG. 10, a linear curve such as shown in (c) of FIG. 10, or a stepped curve such as shown in (d) of FIG. 10. One requirement for the matches is that the larger the quantization parameter, the smaller the estimation parameters. The parameter T may be constant irrespective of the quantization parameter, because it determines the maximum level in the level limitation.

Accordingly, the estimation accuracy determiner 409 decides the parameters T and $\alpha_r$ for the level limitation and constant multiplication, respectively, depending on the quantization parameter from the base-layer encoder 105, and sends them to the level-limiter and constant-multiplier 405.

In order to maintain the compatibility between the layered coding and decoding apparatuses 101 and 103 in terms of the quantization parameter and the parameters T and $\alpha_r$, it is preferable to: decide beforehand which of the matches in (a) to (d) of FIG. 10 is used and prestore the decided match in the apparatuses 101 and 103; or prestore all of the matches in the apparatuses 101 and 103, with information on which of the matches is used being sent together with the base-layer quantization parameter from the apparatus 101 to the apparatus 103.

Disclosed next is the enhancement-layer encoder 107 shown in FIG. 4.

The enhancement-layer encoder 107 is equipped with, at least, the frame memory-I 411, a frame memory-II 412, a motion estimator 413, a motion compensator 414, an intra predictor 415, a predictive-signal selector 416, a predictive-error signal generator 417 (which may be a subtractor), an orthogonal-transformer and quantizer 418, an entropy encoder 419, an inverse-quantizer and inverse-orthogonal transformer 420, a signal composer (or adder) 421, and a deblocking filter 422. The encoder 107 shown in FIG. 4 is a variation of an H.264-encoder, each unit being achieved with known circuitry (the H.264-encoder can also be employed as the base-layer encoder 105).

The frame memory-I 411 receives and stores the input original video signal. The stored signal is supplied to the predictive-error signal generator 417 and the motion estimator 413. In detail, the frame memory-I 411 outputs a frame signal to the generator 417 and the estimator 413 so that the enhancement-layer encoder 107 and the high-resolution estimated signal generator 106 can work synchronously with each other for the signals supplied to the generator 417 and the estimator 413, and the signal from the signal composer 408 (FIG. 4).

The frame memory-II 412 receives and stores an output signal of the deblocking filter 422. It supplies a frame signal for motion estimation to the motion estimator 413 and another frame signal for motion compensation to the motion compensator 414.

The motion estimator 413 receives output signals of the frame memory-I 411 and the frame memory-II 412 and performs motion estimation, for example, H.264 motion estimation. Information on motion gained by motion estimation is supplied to the motion compensator 414 and the entropy encoder 419.

The motion compensator 414 receives the frame signal from the frame memory-II 411 and the motion information from the motion estimator 413. The compensator 414 performs motion compensation, for example, H.264 motion compensation. A motion-compensated signal is then supplied to the predictive-signal selector 416.

The intra predictor 415 receives an output signal (a decoded signal) of the signal composer 421 and performs intra prediction, for example, H.264 intra prediction. An intra-predicted signal is then supplied to the predictive-signal selector 416.

The motion estimator 413 and the motion compensator 414 work together to perform a motion-estimation and motion-compensation procedure, or a motion-compensated prediction procedure.

The predictive-signal selector 416 receives the motion-compensated signal and the intra-predicted signal from the motion compensator 414 and the intra predictor 415, respectively. Also supplied to the selector 416 is the high-resolution estimated signal generated by the signal composer 408 of the high-resolution estimated signal generator 106, as already described.

The predictive-signal selector 416 selects one of the received signals or performs weighting each signal and combining the weighted signals. Signal selection or composition may be done under any appropriate criteria for higher coding efficiency with a known scheme. For example, signal selection or composition may be done so that a predictive-error signal has a smaller value in mean square for higher coding efficiency. The following are some of the options for signal selection or composition: select a signal that gives the least total sum per block in the absolute value to a predictive-error signal from the predictive-error signal generator 417; combine a motion-compensated signal from the motion compensator 414, an intra-predicted signal from the intra predictor 415, and a high-resolution estimated signal from the high-resolution estimated signal generator 106 at a ratio that gives the least total sum per block in the absolute value to a predictive-error signal from the predictive-error signal generator 417; select a signal that gives a smaller total sum per block in the absolute value to a predictive-error signal after orthogonal transform and quantization at the orthogonal-transformer and quantizer 418; and select a signal that gives a smaller code amount to a bitstream output by the entropy encoder 419.

The selected (or composed) signal is then supplied as a predictive signal to the predictive-error signal generator 417 and the signal composer 421.

The predictive-error signal generator 417 (which may be a subtractor), receives the frame signal and the predictive signal from the frame memory-I 411 and the predictive-signal selector 416, respectively. The generator 417 subtracts the predictive signal from the frame signal to produce a predictive-error signal. The predictive-error signal is then supplied to the orthogonal-transformer and quantizer 418.

The orthogonal-transformer and quantizer 418 receives the predictive-error signal and performs an orthogonal-transforming and quantizing procedure at the enhancement layer. The orthogonal transforming may be DCT, Hadamard transform or wavelet. A further alternative is an H.264-type with combination of orthogonal-transforming and quantizing. An orthogonally-transformed and quantized signal is then supplied to the entropy encoder 419 and the inverse-quantizer and inverse-orthogonal transformer 420. Also output by the orthogonal-transformer and quantizer 418 is a quantization parameter used in controlling the quantization step size in quantization at the enhancement layer, which is supplied to the entropy encoder 419.

The entropy encoder 419 receives: the enhancement-layer orthogonally-transformed and quantized signal from the orthogonal-transformer and quantizer 418; the enhancement-layer motion information from the motion estimator 413; the enhancement-layer quantization parameter from the orthogonal-transformer and quantizer 418; and a coding parameter that is, for example, a predictive-signal selection information indicating a signal selected by the predictive-signal selector 416, as a predictive signal. The encoder 419 applies an entropy encoding procedure to these signal, information and parameters, thus generating an enhancement layer output bitstream.

Concerning the base-layer encoder 105, when the closed-loop type is employed for the encoder 105, its circuit configuration (not shown) may be similar to the enhancement-layer encoder 107, such as shown in FIG. 4, as discussed above. In closed-loop type, the base-layer encoder 105 may also receive: a base-layer orthogonally-transformed and quantized signal; base-layer motion information; a base-layer quantization parameter; and a coding parameter that is, for example, a predictive-signal selection information indicating a signal selected in predictive-signal selection, as a predictive signal. The encoder 105 then applies an entropy encoding procedure to these signal, information and parameters, thus generating a base-layer output bitstream.

In FIG. 1, the multiplexer 108 receives the base-layer bitstream from the base-layer encoder 105 and also the enhancement-layer bitstream from the enhancement-layer encoder 107, and multiplexes them into a multiplexed bitstream, as discussed above, such as illustrated in FIG. 11. The multiplexed bitstream is output to the layered decoding apparatus 103 via the network 102.

FIG. 11 exemplary shows three types of format for the multiplexed bitstream generated by the layered coding apparatus and method disclosed above.

A multiplexed-bitstream format illustrated in (a) of FIG. 11 consists of a header, a base-layer header, an enhancement-layer header, a base-layer bitstream, and an enhancement-layer bitstream. The bitstreams generated by the base-layer encoder 105 and the enhancement-layer encoder 107 correspond to the base-layer bitstream and the enhancement-layer bitstream, respectively, shown in (a) of FIG. 11. Stored in the base-layer header are the motion information, the quantization parameter and the predictive-signal selection information, etc., required in base-layer coding. Stored in the enhancement-layer header are the motion information, the quantization parameter and the predictive-signal selection information, etc., required in enhancement-layer coding. The order of the headers and bitstreams shown in (a) of FIG. 11 may be changed like shown in (b) of FIG. 11. The information and parameters stored in the base-layer and enhancement-layer headers in (a) of FIG. 11 may all be stored in a header like shown in (c) of FIG. 11. Although not shown, the information and parameters may be stored in a header, a slice, a macroblock, etc., in each frame (picture) in the base-layer and enhancement-layer bitstreams. These formats can also be applied to the other embodiments, which will be disclosed later.

Again, in FIG. 4, the inverse-quantizer and inverse-orthogonal transformer 420 receives the orthogonally-transformed and quantized signal from the orthogonal-transformer and quantizer 418, to perform an inverse-quantizing and inverse-orthogonal transforming procedure. An inverse-quantized and inverse-orthogonal transformed signal is then supplied to the signal composer 421.

The signal composer 421 (or an adder) receives the predictive signal and the inverse-quantized and inverse-orthogonal transformed signal from the predictive-signal selector 416 and the inverse-quantizer and inverse-orthogonal transformer 420, respectively. Then, the signal composer 421 combines (or adds) the two signals to produce a decoded signal. The decoded signal is then supplied to the intra predictor 415 and the deblocking filter 422.

The deblocking filter 422 receives the decoded signal and applies a deblocking filtering procedure to the signal. The filter 422 may be an H.264 deblocking filter. The deblocking-filtered signal is supplied to the frame memory-II 412 and stored therein.

Figure 5:
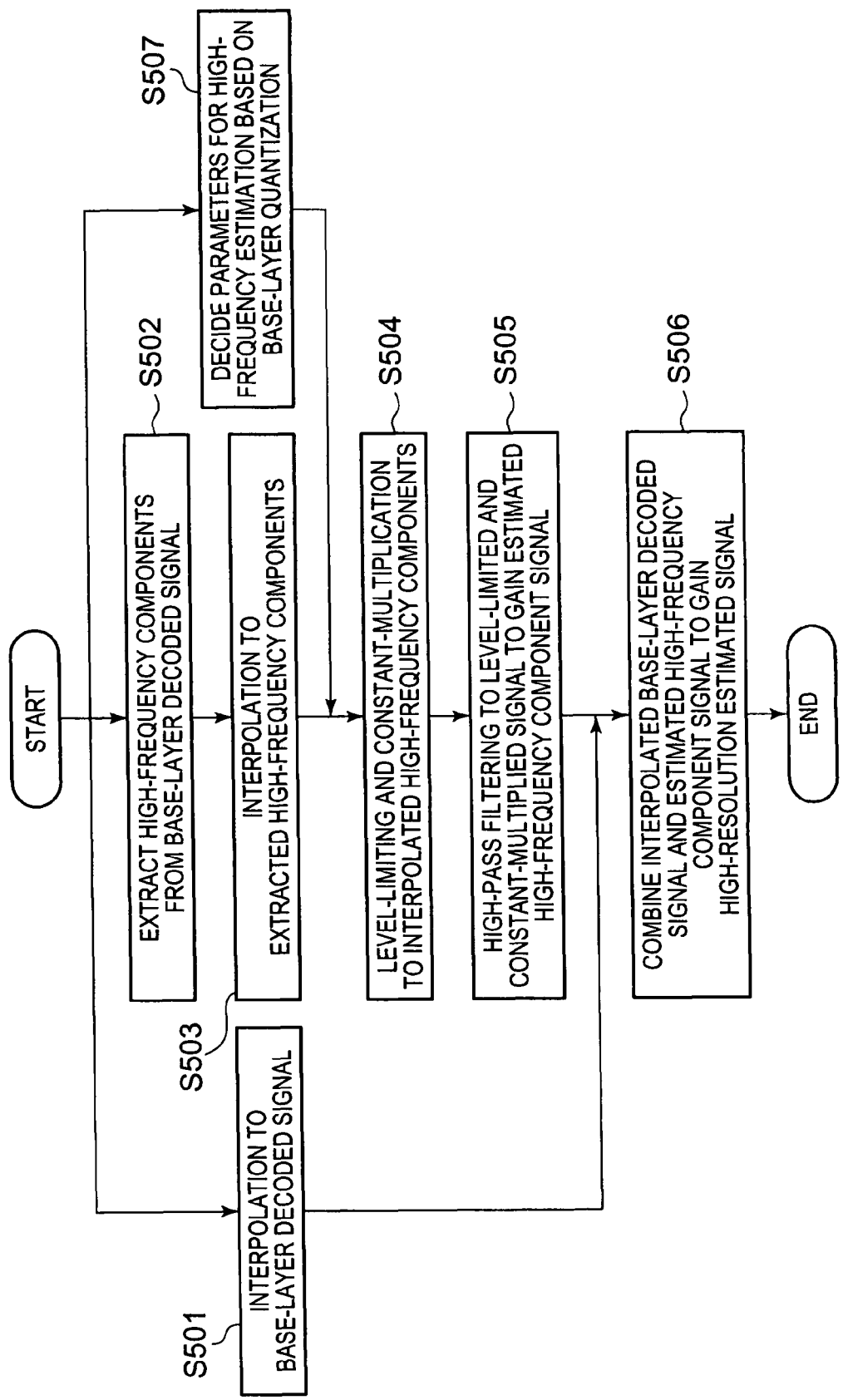
FIG. 5 shows a flowchart of a high-resolution estimated signal generation procedure that corresponds to the functions of the high-resolution estimated signal generator shown in FIG. 4.

Described next with reference to FIG. 5 is a high-resolution estimated signal generation procedure that corresponds to the several functions of the high-resolution estimated signal generator 106 shown in FIG. 4.

An interpolation procedure is applied to an input base-layer decoded signal so that the signal exhibits the spatial resolution the same as the input original video signal (step S501).

Parameters T and $\alpha_r$ for use in high-frequency estimation are decided based on a base-layer quantization parameter (step S507).

A high-frequency components signal is extracted from the input base-layer decoded signal (step S502). An interpolation procedure is applied to the extracted high-frequency components signal so that the high-frequency components exhibit the spatial resolution the same as the input original video signal (step S503). A level-limiting and constant-multiplication procedure is applied, with the parameters decided in step S507, to the interpolated high-frequency components signal (step S504). A high-pass filtering procedure is applied to a level-limited and constant-multiplied signal to gain an estimated high-frequency components signal (step S505).

The estimated high-frequency components signal and the interpolated signal gained in the step S501 are combined to obtain a high-resolution estimated signal (step S506).

Figure 6:
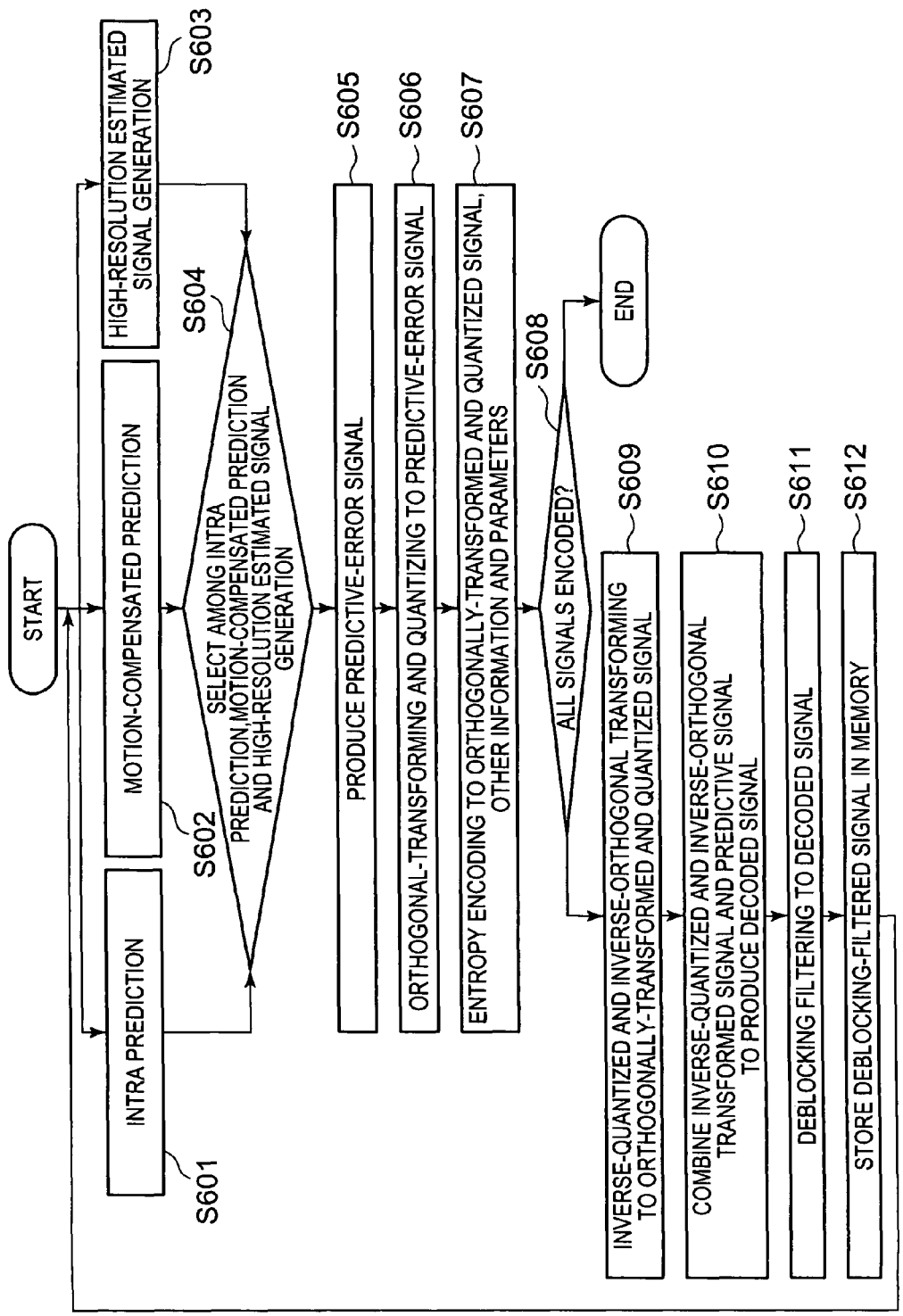
FIG. 6 shows a flowchart of an enhancement-layer encoding procedure that corresponds to the functions of the enhancement-layer encoder shown in FIG. 4.

Described next with reference to FIG. 6 is an enhancement-layer encoding procedure that corresponds to the several functions of the enhancement-layer encoder 107 shown in FIG. 4.

An intra prediction procedure is applied to a given decoded signal to gain an intra-predicted signal (step S601). A motion-compensated prediction procedure is applied to an input original video signal and a decoded signal to gain a motion-compensated signal, with motion information gained in motion estimation at the enhancement layer (step S602). A high-resolution estimated signal is generated (step S603), through the high-resolution estimated signal generation procedure described with respect to FIG. 5.

One of the intra-predicted signal, the motion-compensated signal, and the high-resolution estimated signal is selected or each signal is weighted and combined to produce a predictive signal (step S604). The predictive signal is subtracted from the input original video signal to produce a predictive-error signal (step S605). An orthogonal-transforming and quantizing procedure is applied to the predictive-error signal (step S606). An entropy encoding procedure is applied to the orthogonally-transformed and quantized signal, the enhancement-layer motion information, the enhancement-layer quantization parameter, and the coding parameter, for example, a predictive-signal selection information indicating the selected signal (step S607).

It is determined whether all of the signals to be coded have been coded (step S608). If "YES", the enhancement-layer encoding procedure ends. If "NO", the following decoding and deblocking procedure is executed.

In the decoding and deblocking procedure: an inverse-quantizing and inverse-orthogonal transforming procedure is applied to the orthogonally-transformed and quantized signal gained in step S606 (step S609); the inverse-quantized and inverse-orthogonal transformed signal and the predictive signal gained in step S605 are combined to produce a decoded signal (step S610); a deblocking filtering procedure is applied to the decoded signal (step S611); and the deblocking-filtered signal is stored in a memory (step S612), like the frame memory-II 412 (FIG. 4) for the succeeding procedure (steps S601, S602 and S603).

As disclosed above in detail, the layered coding apparatus 101 and the corresponding coding method in the present invention achieve efficient layered coding to give images of higher quality. This is because of coding with inter-spatial resolution prediction to an input original video signal using a high-resolution estimated signal, as a predictive signal, given by accurate high-frequency estimation with a base-layer quantization parameter, in addition to interpolation (spatially scaling-up) in known layered coding.

This layered coding scheme is highly efficient with the spatial-resolution enhancing procedure to produce a predictive signal having a higher correlation with the input original video signal (a high-resolution signal) in terms of spatial resolution, from a base-layer low-resolution signal, under consideration of the coding characteristics at the base layer. The coding characteristics at the base layer can be treated only with the base-layer quantization parameter. Thus, the layered coding scheme achieves higher efficiency with a lower circuit scale with a smaller amount of computation in controlling the spatial-resolution enhancing procedure, with no additional parameters in transfer for decoding.

Figure 7:
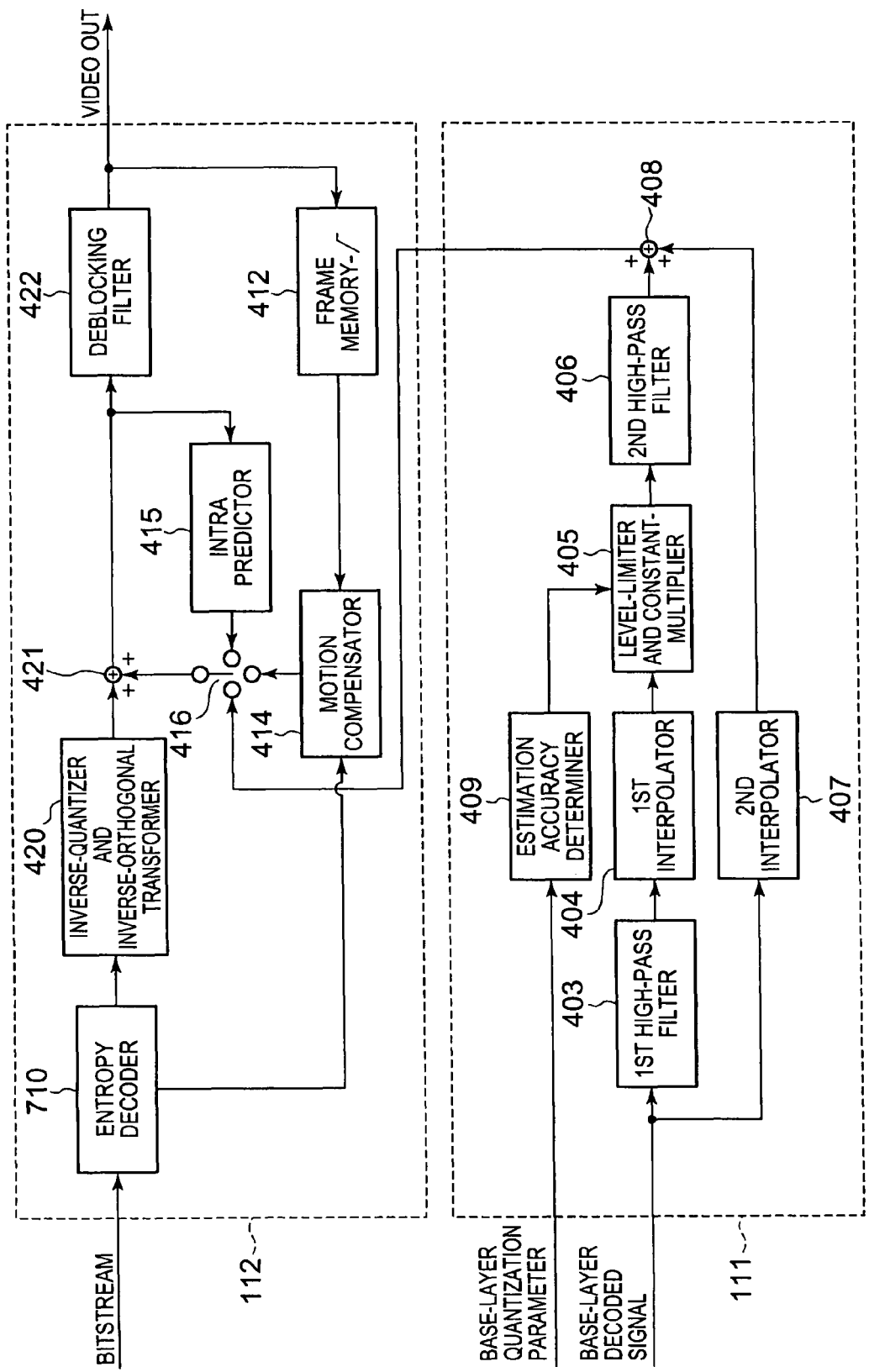
FIG. 7 shows block diagrams of an enhancement-layer decoder and a high-resolution estimated signal reconstructor of the layered decoding apparatus shown in FIG. 1.

FIG. 7 shows exemplary block diagrams of the high-resolution estimated signal reconstructor 111 and the enhancement-layer decoder 112 of the layered decoding apparatus 103 (FIG. 1).

The high-resolution estimated signal reconstructor 111 is equipped with, at least, a first high-pass filter 403, a first interpolator 404, a level-limiter and constant-multiplier 405, a second high-pass filter 406, a second interpolator 407, a signal composer (or adder) 408, and an estimation accuracy determiner 409.

The high-resolution estimated signal reconstructor 111 of the layered decoding apparatus 103 has the same circuit configuration as the high-resolution estimated signal generator 106 (FIG. 4) of the layered coding apparatus 101, thus given the same reference numerals and explanation thereof being omitted for brevity.

Figure 9:
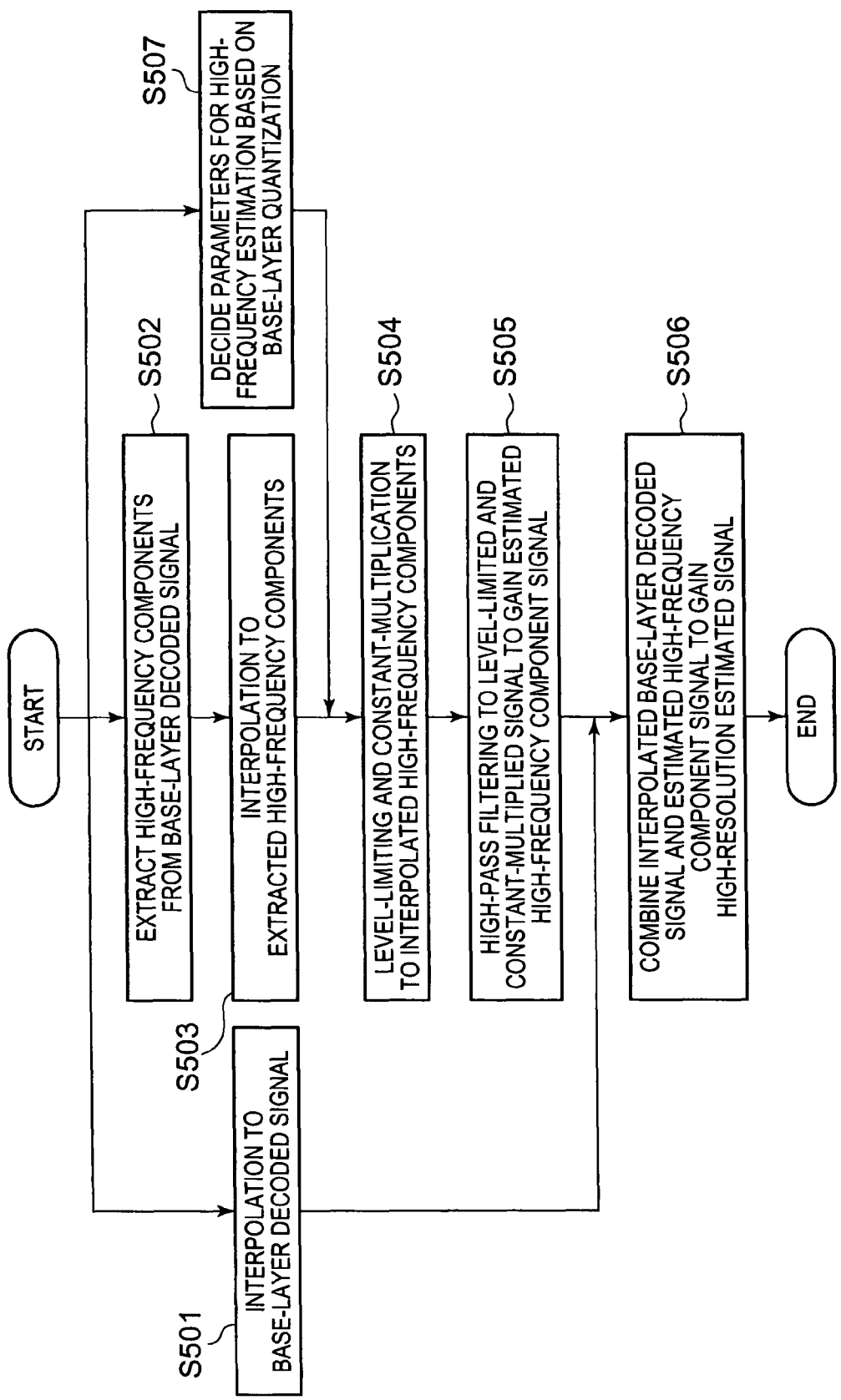
FIG. 9 shows a flowchart of a high-resolution estimated signal reconstruction procedure that corresponds to the functions of the high-resolution estimated signal reconstructor shown in FIG. 7.

Moreover, a high-resolution estimated signal reconstruction procedure that corresponds to the several functions of the high-resolution estimated signal reconstructor 111 can be performed in the same as the high-resolution estimated signal generation procedure (FIG. 5) corresponding to the several functions of the high-resolution estimated signal generator 106. The high-resolution estimated signal reconstruction procedure is shown in FIG. 9 which is identical to FIG. 5 for the high-resolution estimated signal generation procedure. Thus, the explanation of the high-resolution estimated signal reconstruction procedure is also omitted for brevity.

In FIG. 7, the enhancement-layer decoder 112 is equipped with, at least, an entropy decoder 710, a frame memory-II 412, a motion compensator 414, an intra predictor 415, a predictive-signal selector 416, an inverse-quantizer and inverse-orthogonal transformer 420, a signal composer (or adder) 421, and a deblocking filter 422. The units of the encoder 112, besides the entropy decoder 710, are identical to the counterparts shown in FIG. 4, and hence given the same reference numerals and the detailed explanation thereof being omitted.

The entropy decoder 710 receives an enhancement-layer bitstream from the extractor 109 (FIG. 1) and applies an entropy decoding procedure to the bitstream to gain an enhancement-layer decoded signal, the enhancement-layer quantization parameter from the orthogonal-transformer and quantizer 418, the enhancement-layer motion information from the motion estimator 413, and the predictive-signal selection information from the predictive-signal selector 416, of the layered coding apparatus 101 (FIG. 4). The enhancement-layer decoded signal and the enhancement-layer quantization parameter are supplied to the inverse-quantizer and inverse-orthogonal transformer 420. The enhancement-layer motion information is supplied to the motion compensator 414. The predictive-signal selection information is supplied to the predictive-signal selector 416.

Although not shown, the circuit configuration of the base-layer decoder 110 can be achieved similar to the enhancement-layer decoder 112 shown in FIG. 7.

Like the entropy decoder 710 of the enhancement-layer decoder 112, an entropy decoder of the base-layer decoder 110 receives an base-layer bitstream from the extractor 109 (FIG. 1) and applies an entropy decoding procedure to the bitstream to gain a base-layer decoded signal, the base-layer quantization parameter, base-layer motion information, and the predictive-signal selection information. These signal, parameter and information at the base layer are supplied to those of the base-layer decoder 110, corresponding to the counterparts 414, 416 and 420 of the enhancement-layer decoder 112. The base-layer quantization parameter may, however, be supplied to the high-resolution estimated signal reconstructor 111 (FIG. 1) via or not via the inverse-quantizer and inverse-orthogonal transformer of the base-layer decoder 110.

Figure 8:
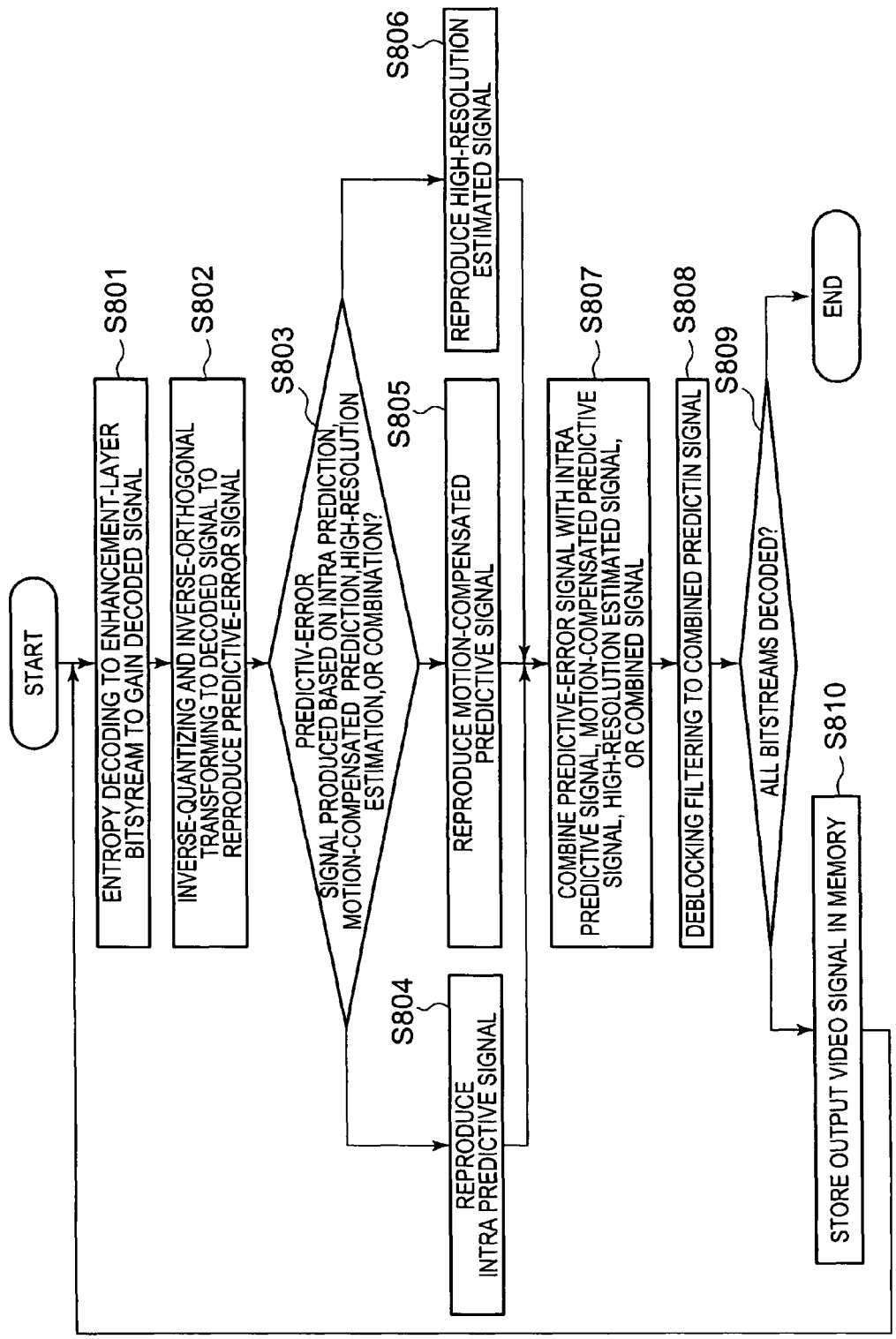
FIG. 8 shows a flowchart of an enhancement-layer decoding procedure that corresponds to the functions of the enhancement-layer decoder shown in FIG. 7.

Described next with reference to FIG. 8 is an enhancement-layer decoding procedure that corresponds to the several functions of the enhancement-layer decoder 112 shown in FIG. 7, to reproduce an enhancement-layer video signal of the same resolution as the input original video signal.

An entropy decoding procedure is applied to an input enhancement-layer bitstream to gain a decoded signal (step S801). An inverse-quantizing and inverse-orthogonal transforming procedure is applied to the decoded signal to reproduce a predictive-error signal (step S802).

It is determined whether the predictive-error signal has been produced per block based on intra prediction, motion-compensated prediction, high-resolution estimation or combination of these procedures, based on the predictive-signal selection information carried by the enhancement-layer bitstream (step S803).

When the predictive-error signal has been produced based on the intra prediction, intra prediction is performed to reproduce an intra predictive signal (step S804). When it has been produced based on the motion-compensated prediction, motion compensation is performed to reproduce a motion-compensated predictive signal (step S805). Moreover, when it has been produced based on the high-resolution estimation, a high-resolution estimated signal is reproduced (step S806). In contrast, when it has been produced based on the combination of the procedures, those signals are reproduced (steps S804 to S806), then each signal is weighted and combined.

The reproduced predictive-error signal is combined with one of the intra predictive signal, the motion-compensated predictive signal, the high-resolution estimated signal, and the combined signal (step S807).

A deblocking filtering procedure is applied to the combined signal gained in step S807 (step S808) to reproduce an output video signal to be supplied to a display apparatus, etc.

The output video signal is stored in a memory, like the frame memory-II 412 (FIG. 7), as a reference frame (step S810) for a further enhancement-layer decoding procedure (steps S801 to S S810) until all of the bitstreams are decoded (step S809).

As disclosed above in detail, the layered decoding apparatus 103 and the corresponding decoding method in the present invention achieve efficient and accurate layered decoding to a predictive error signal coded at the enhancement layer with a smaller amount of inter-layer predictive errors by way of the accurate high-resolution estimated signal generation procedure based on the quantization parameter at the base-layer encoding. This is achieved by: extracting enhancement- and base-layer bitstreams from an input multiplexed bitstream (at the extractor 109); reproducing a decoded signal and a quantization parameter at the base layer (at the base-layer decoder 110); reconstructing a high-resolution estimated signal, an estimated version of the original video signal (at the high-resolution estimated signal reconstructor 111 with estimation accuracy controlled based on the base-layer decoded signal and the base-layer quantization parameter); and decoding the predictive error signal coded at the enhancement layer using the high-resolution estimated signal as a predictive signal.

Disclosed next is a variation to the high-resolution estimated signal generator 106 shown in FIG. 4.

Figure 12:
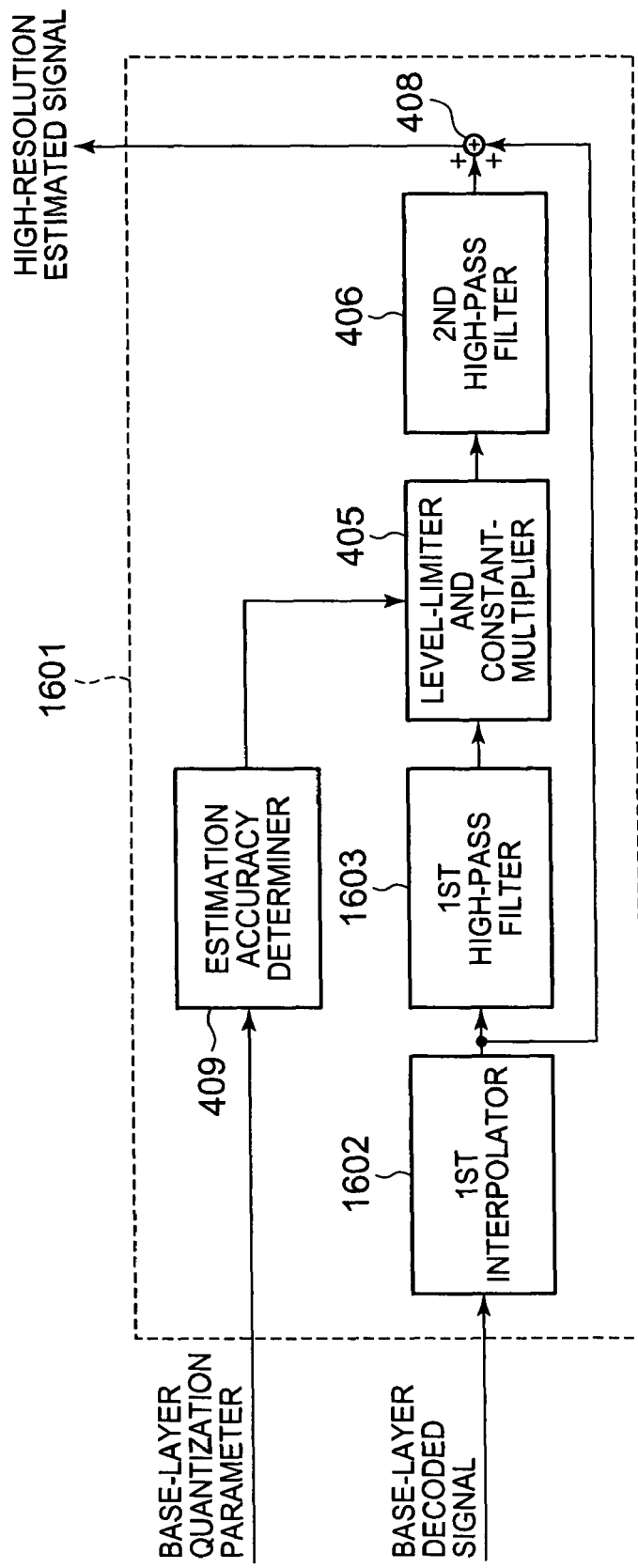
FIG. 12 shows a block diagram of a high-resolution estimated signal generator, a variation to the high-resolution estimated signal generator shown in FIG. 4, which can also be used as a variation to the high-resolution estimated signal reconstructor shown in FIG. 7.

FIG. 12 shows a block diagram of a high-resolution estimated signal generator 1601 that is a variation to the high-resolution estimated signal generator 106 (FIG. 4). The circuit configuration in FIG. 12 can also be used as a variation to the high-resolution estimated signal reconstructor 111 shown in FIG. 7.

The difference between the high-resolution estimated signal generator 106 (FIG. 4) and the variation 1601 (FIG. 12) is as follows: In the former (FIG. 4), the input base-layer decoded signal is subjected to extraction of high-frequency components at the first high-pass filter 403 and also interpolation at the second interpolator 404, followed by interpolation to the high-frequency components at the first interpolator 404. On the contrary, in the latter (FIG. 12), the input base-layer decoded signal is subjected to interpolation followed by extraction of high-frequency components from the interpolated signal, to achieve reduction of the processing amount and memory capacity. Linear interpolation and extraction of high-frequency components give the same results irrespective of the order of interpolation and extraction. Nevertheless, the variation 1601 (FIG. 12) performs interpolation followed by extraction of high-frequency components, filtering after interpolation that is a filtering procedure to a sampling-frequency-changed signal.

The high-resolution estimated signal reconstructor 1601 is equipped with, at least, a first interpolator 1602, a first high-pass filter 1603, a level-limiter and constant-multiplier 405, a second high-pass filter 406, a signal composer (or adder) 408, and an estimation accuracy determiner 409. The units except the first interpolator 1602 and the first high-pass filter 1603 are identical to the counterparts shown in FIGS. 4 and 7, and hence given the same reference numerals and the explanation thereof being omitted.

The first interpolator 1602 receives a base-layer decoded signal and applies an interpolation procedure to the decoded signal so that the decoded signal exhibits the spatial resolution the same as the input original video signal at the enhancement layer. The interpolation can be performed according to the expression (8) described above. The filter coefficients and interpolation function, etc., may however be different from those in the expression (8). The interpolated signal is supplied to the first high-pass filter 1603 and the signal composer 408.

The first high-pass filter 1603 receives the interpolated signal and extracts high-frequency components, for example, according to the expressions (1) and (2) described above. The interpolated signal input to the high-pass filter 1603 exhibits higher resolution due to interpolation so that it requires a higher sampling frequency when filtered in a bandwidth in the expression (2). For example, an enlargement scale factor "r" (resolution at the enhancement layer/resolution at the base layer) of 2 requires a bandwidth in the expression (2) ½ times that in the embodiment shown in FIG. 4.

The expressions (1) and (2) are just an option for the first high-pass filter 1603. One preferable requirement for the high-pass filter 1603 is that the filter coefficients and interpolation function, etc., of the filter 1603 satisfy the pyramid structure with those of the spatial decimator 104 (FIG. 1), the first interpolator 1602, and the second high-pass filter 406.

The high-frequency components extracted by the first high-pass filter 1603 is supplied to the level-limiter and constant-multiplier 405, the remaining procedure in FIG. 12 being basically the same as disclosed with reference to FIG. 4.

Figure 13:
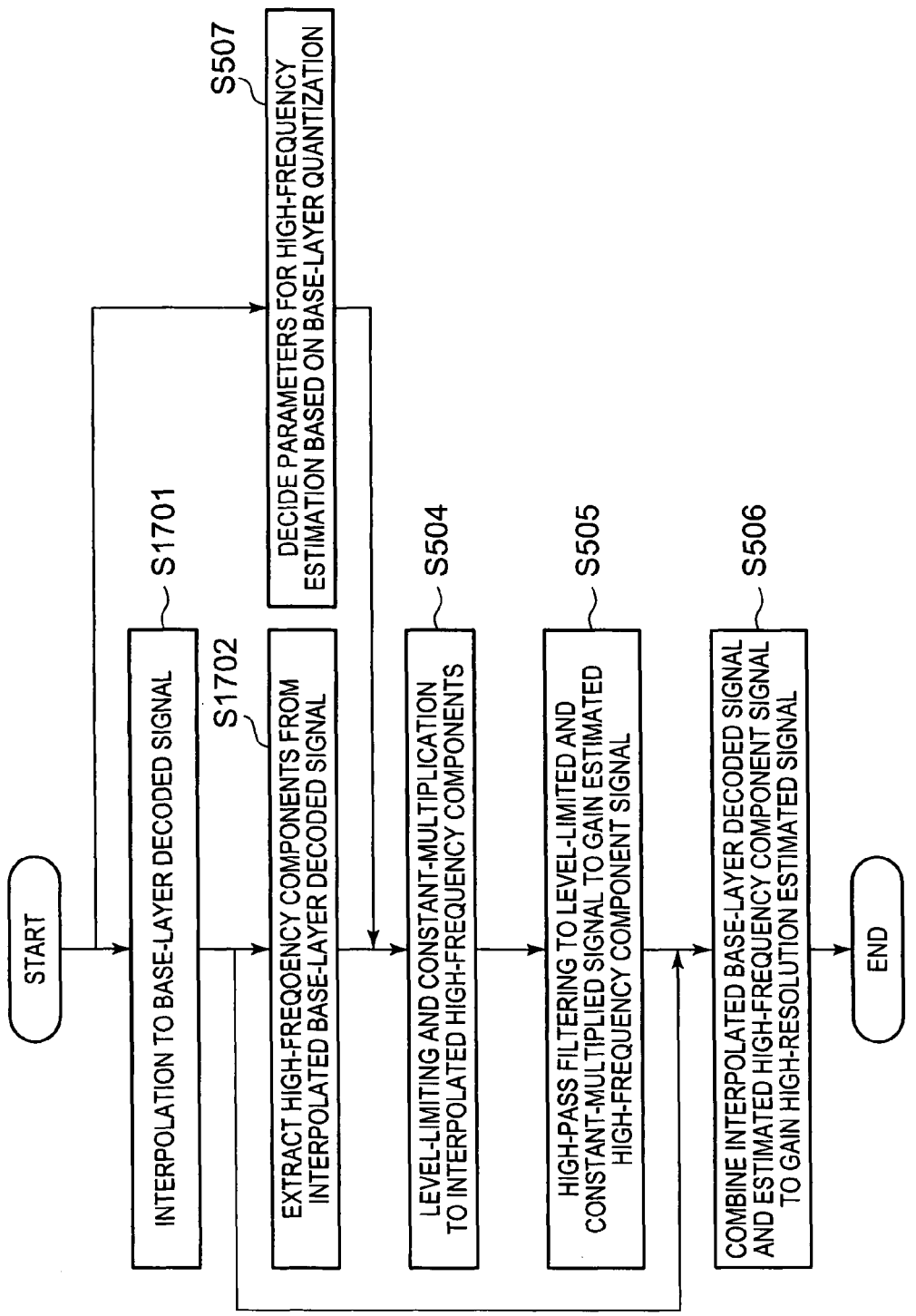
FIG. 13 shows a flowchart of a high-resolution estimated signal generation procedure that corresponds to the functions of the high-resolution estimated signal generator shown in FIG. 12.

Described next with reference to FIG. 13 is a high-resolution estimated signal generation procedure that corresponds to the several functions of the high-resolution estimated signal generator 1601 shown in FIG. 12. In FIG. 13, the steps identical to those in FIG. 5 are given the same step numbers and the explanation thereof being omitted.

An interpolation procedure is applied to an input base-layer decoded signal so that the signal exhibits the spatial resolution the same as an input original video signal (step S1701). High-frequency components are extracted from the interpolated base-layer decoded signal (step S1702).

The succeeding procedures are the same as those described with reference to FIG. 5 to reconstruct a high-resolution estimated signal.

The high-resolution estimated signal generator 1601 (FIG. 12), a variation to the high-resolution estimated signal generator 106 (FIG. 4) gives almost the same advantages as the generator 106 when implemented into the layered coding apparatus 101 (FIG. 1).

In detail, the layered coding apparatus 101 with the high-resolution estimated signal generator 1601 and the corresponding coding method in the present invention achieve efficient layered coding to give images of higher quality. This is because of coding with inter-spatial resolution prediction to an input original video signal using a high-resolution estimated signal, as a predictive signal, given by accurate high-frequency estimation with a base-layer quantization parameter, in addition to interpolation (spatially scaling-up) in known layered coding.

Moreover, when the circuit configuration shown in FIG. 12 is employed as a variation to the high-resolution estimated signal reconstructor 111 (FIG. 7), it gives almost the same advantages as the reconstructor 111 when implemented into the layered coding apparatus 101 (FIG. 1).

In detail, the layered decoding apparatus 103 with the high-resolution estimated signal reconstructor (1601) and the corresponding coding method in the present invention achieve efficient and accurate layered decoding to a predictive error signal coded at the enhancement layer with a smaller amount of inter-layer predictive errors by way of the accurate high-resolution estimated signal generation procedure based on the quantization parameter at the base-layer encoding.

Furthermore, different from the high-resolution estimated signal generator 106 and rereconstructor 111 in FIGS. 4 and 7, respectively, the variation 1601 shown in FIG. 12 is equipped with the first interpolator 1602 in front of the first high-pass filter 1603, with the output of the interpolator 1602 being supplied to the filter 1603 and also directly to the signal composer 408. This circuit configuration omits the second interpolator 407, an essential component to the generator 106 and rereconstructor 111 shown in FIGS. 4 and 7, respectively, thus achieving reduction of the number of components.

The several functions of the layered coding and decoding apparatuses 101 and 103 disclosed above with reference to FIGS. 1 to 13 can be achieved with software programs according to the present invention.

Figure 14:
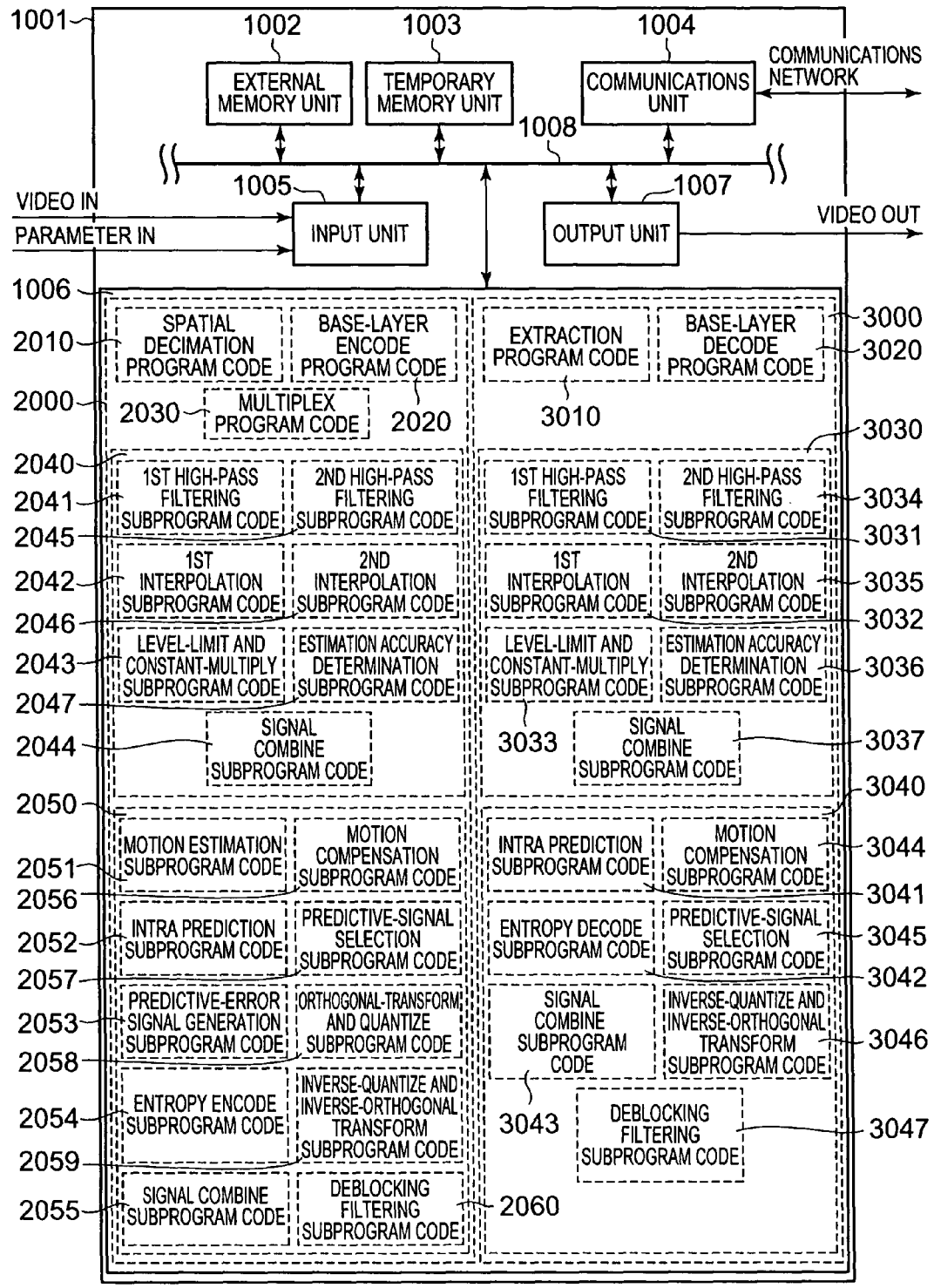
FIG. 14 shows a block diagram of a data processing system with software programs installed therein that correspond to the functions of the layered coding and decoding apparatuses shown in FIG. 1.

FIG. 14 shows a data processing system 1001 with software programs installed therein that correspond to the functions of the layered coding and decoding apparatuses 101 and 103 (FIG. 1).

The data processing system 1001 is equipped with: an input unit 1005 for entering several kinds of data (video signals, parameters, etc.); an output unit 1007 for outputting several kinds of data; a central and controlling processing unit 1006 with layered coding and decoding programs installed therein that correspond to the functions of the layered coding and decoding apparatuses 101 and 103, respectively; an external memory unit 1002; a temporary memory unit 1003 to be used, for example, as a working area in processing at the central processing and controlling unit 1006; and a communications unit 1004 for external communications. The units are connected to one another via a bidirectional bus 1008.

Installed in the central processing and controlling unit 1006 from a storage medium or via a communications network through the communications unit 1004 are a layered coding program 2000 that corresponds to the functions of the layered coding apparatus 101 and also a layered decoding program 3000 that corresponds to the functions of the layered decoding apparatus 103.

The layered coding program 2000 includes computer readable program codes, at least, a spatial decimation program code 2010, a base-layer encode program code 2020, a multiplex program code 2030, a high-resolution estimated signal generation program code 2040, and an enhancement-layer encode program code 2050.

The program codes 2010, 2020, 2030, 2040 and 2050 correspond to the functions of the spatial decimator 104, the base-layer encoder 105, the multiplexer 108, the high-resolution estimated signal generator 106, and the enhancement-layer encoder 107, respectively, shown in FIG. 1.

The high-resolution estimated signal generation program code 2040 includes a first high-pass filtering subprogram code 2041, a first interpolation subprogram code 2042, a level-limit and constant-multiply subprogram code 2043, a signal combine subprogram code 2044, a second high-pass filtering subprogram code 2045, a second interpolation subprogram code 2046, and an estimation accuracy determination subprogram code 2047.

The subprogram codes 2041, 2042, 2043, 2044, 2045, 2046, and 2047 correspond to the functions of the first high-pass filter 403, the first interpolator 404, the level-limiter and constant-multiplier 405, the signal composer 408, the second high-pass filter 406, the second interpolator 407, and the estimation accuracy determiner 409, respectively, shown in FIG. 4.

The enhancement-layer encode program code 2050 includes a motion estimation subprogram code 2051, an intra prediction subprogram code 2052, a predictive-error signal generation subprogram code 2053, an entropy encode subprogram code 2054, a signal combine subprogram code 2055, a motion compensation subprogram code 2056, a predictive-signal selection subprogram code 2057, an orthogonal-transform and quantize subprogram code 2058, an inverse-quantize and inverse-orthogonal transform subprogram code 2059, and a deblocking filtering subprogram code 2060.

The subprogram codes 2051, 2052, 2053, 2054, 2055, 2056, 2057, 2058, 2059, and 2060 correspond to the functions of the motion estimator 413, the intra predictor 415, the predictive-error signal generator 417, the entropy encoder 419, the signal composer 421, the motion compensator 414, the predictive-signal selector 416, the orthogonal-transformer and quantizer 418, the inverse-quantizer and inverse-orthogonal transformer 420, and the deblocking filter 422, respectively, shown in FIG. 4.

The layered decoding program 3000 includes computer readable program codes, at least, an extraction (a separation) program code 3010, a base-layer decode (first decode) program code 3020, a high-resolution estimated signal reconstruction program code 3030, and an enhancement-layer decode program code 3040.

The program codes 3010, 3020, 3030, and 3040 correspond to the functions of the extractor (separator) 109, the base-layer decoder (first decoder) 110, the high-resolution estimated signal reconstructor 111, and the enhancement-layer decoder 112 (second decoder), respectively, shown in FIG. 1.

The high-resolution estimated signal reconstruction program code 3030 includes a first high-pass filtering subprogram code 3031, a first interpolation subprogram code 3032, a level-limit and constant-multiply subprogram code 3033, a second high-pass filtering subprogram code 3034, a second interpolation subprogram code 3035, an estimation accuracy determination subprogram code 3036, and a signal combine subprogram code 3037.

The subprogram codes 3031, 3032, 3033, 3034, 3035, 3036, and 3037 correspond to the functions of the first high-pass filter 403, the first interpolator 404, the level-limiter and constant-multiplier 405, the second high-pass filter 406, the second interpolator 407, the estimation accuracy determiner 409, and the signal composer 408, respectively, shown in FIG. 7.

The enhancement-layer encode program code 3040 includes an intra prediction subprogram code 3041, an entropy decode subprogram code 3042, a signal combine subprogram code 3043, a motion compensation subprogram code 3044, a predictive-signal selection subprogram code 3045, an inverse-quantize and inverse-orthogonal transform subprogram code 3046, and a deblocking filtering subprogram code 3047.

The subprogram codes 3041, 3042, 3043, 3044, 3045, 3046, and 3047 correspond to the functions of the intra predictor 415, the entropy decoder 710, the signal composer 421, the motion compensator 414, the predictive-signal selector 416, the inverse-quantizer and inverse-orthogonal transformer 420, and the deblocking filter 422, respectively, shown in FIG. 7.

The data processing system 1001 is equipped with the central and controlling processing unit 1006 with the layered coding and decoding programs installed therein that correspond to the functions of the layered coding and decoding apparatuses 101 and 103, respectively.

Such a central and controlling processing unit may, however, install either of the layered coding and decoding programs. And, two data processing systems equipped with central and controlling processing units each having either of the layered coding and decoding programs can be connected via a network.

The system shown in FIG. 14 having the layered coding and decoding programs installed therein also gives the same advantages as discussed for the layered coding and decoding apparatuses and methods disclosed above.

As disclosed above in detail, the layered coding apparatus, method and program according to the present invention achieve efficient layered coding to give images of higher quality by way of coding with inter-spatial resolution prediction to an input original video signal using a high-resolution estimated signal, as a predictive signal, given by accurate high-frequency estimation with a base-layer quantization parameter, in addition to interpolation (spatially scaling-up) in known layered coding.

Moreover, as disclosed above in detail, the layered decoding apparatus, method and program according to the present invention achieve efficient and accurate layered decoding to a predictive error signal coded at the enhancement layer with a smaller amount of inter-layer predictive errors by way of the accurate high-resolution estimated signal generation procedure based on the quantization parameter at the base-layer encoding.

What is claimed is:

1. A video-signal layered decoding apparatus for decoding an input bitsteam at a plurality of decoding layers exhibiting different spatial resolutions, the apparatus comprising at each decoding layer:
   a separator to separate an input bitsteam into first coded data, second coded data and a coded quantization parameter, the first coded data being an encoded version of a resolution-lowered video signal exhibiting a spatial resolution lower than an original video signal and obtained by spatially scaling down the original video signal, the second coded data being an encoded version of the original video signal obtained through inter-spatial resolution prediction using a high-resolution scaled-up video signal as a predictive signal and exhibiting a spatial resolution higher than the resolution-lowered video signal, the high-resolution scaled-up video signal being obtained by spatially scaling up a decoded signal through a high-resolution procedure based on the quantization parameter, the decoded signal being obtained through a decoding procedure to the resolution-lowered video signal, the quantization parameter being used in encoding the resolution-lowered video signal;

a first decoder to decode the coded quantization parameter and decode the separated first coded data using the quantization parameter thus decoded to obtain the resolution-lowered video signal;

a reconstructor to spatially scale up the resolution-lowered video signal to reconstruct the high-resolution scaled-up video signal based on the quantization parameter thus decoded; and a second decoder to decode the separated second coded data through inter-spatial resolution prediction using the reconstructed high-resolution scaled-up video signal as a predictive signal, thus obtaining a reproduced video signal of the same high spatial resolution as the input original video signal.

2. The video-signal layered decoding apparatus according to claim 1, wherein the reconstructor includes:

a first high-pass filter to extract high-frequency components from the decoded signal;

a first interpolator to apply a interpolation procedure to the high-frequency components so that the extracted high-frequency components exhibit the same spatial resolution as the original video signal;

a limiter and multiplier to apply a level-limiting and constant-multiplication procedure to the high-frequency components thus applied the interpolation procedure;

an estimation accuracy determiner to determine parameters for the level-limitation and constant-multiplication procedure based on the quantization parameter;

a second high-pass filter to apply a high-pass filtering procedure to the high-frequency components thus applied the level-limiting and constant-multiplication procedure;

a second interpolator to apply interpolation procedure to the decoded signal so that the decoded signal exhibits the same spatial resolution as the original video signal, at a specific scale-up factor; and a signal composer to combine the high-frequency components thus applied the high-pass filtering procedure with the decoded signal thus applied the interpolation procedure, to reconstruct the high-resolution scaled-up video signal.

3. The video-signal layered decoding apparatus according to claim 1, wherein the reconstructor includes:

a first interpolator to apply an interpolation procedure to the decoded signal so that the decoded signal exhibits the same spatial resolution as the original video signal;

a first high-pass filter to extract high-frequency components from the decoded signal thus applied the interpolation procedure;

a limiter and multiplier to apply a level-limiting and constant-multiplication procedure to the extracted high-frequency components;

an estimation accuracy determiner to determine parameters for the level-limitation and constant-multiplication procedure based on the quantization parameter;

a second high-pass filter to apply a high-pass filtering procedure to the high-frequency components thus applied the level-limiting and constant-multiplication procedure; and a signal composer to combine the high-frequency components thus applied the high-pass filtering procedure with the decoded signal thus applied the interpolation procedure, to reconstruct the high-resolution scaled-up video signal.

4. A video-signal layered decoding method of decoding an input bitsteam at a plurality of decoding layers exhibiting different spatial resolutions, the method comprising at each decoding layer:

a separating step of separating an input bitsteam into first coded data, second coded data and a coded quantization parameter, the first coded data being an encoded version of a resolution-lowered video signal exhibiting a spatial resolution lower than an original video signal and obtained by spatially scaling down the original video signal, the second coded data being an encoded version of the original video signal obtained through inter-spatial resolution prediction using a high-resolution scaled-up video signal as a predictive signal and exhibiting a spatial resolution higher than the resolution-lowered video signal, the high-resolution scaled-up video signal being obtained by spatially scaling up a decoded signal through a high-resolution procedure based on the quantization parameter, the decoded signal being obtained through a decoding procedure to the resolution-lowered video signal, the quantization parameter being used in encoding the resolution-lowered video signal;

a first decoding step of decoding the coded quantization parameter and decode the separated first coded data using the quantization parameter thus decoded to obtain the resolution-lowered video signal;

a reconstructing step of spatially scaling up the resolution-lowered video signal to reconstruct the high-resolution scaled-up video signal based on the quantization parameter thus decoded; and a second decoding step of decoding the separated second coded data through inter-spatial resolution prediction using the reconstructed high-resolution scaled-up video signal as a predictive signal, thus obtaining a reproduced video signal of the same high resolution as the input original video signal.

5. A non-transitory computer readable medium having stored thereon a computer program comprising a set of instructions when executed by a computer to implement a method for video-signal layered decoding, the program comprising:

a separating program code of separating an input bitsteam into first coded data, second coded data and a coded quantization parameter, the first coded data being an encoded version of a resolution-lowered video signal exhibiting a spatial resolution lower than an original video signal and obtained by spatially scaling down the original video signal, the second coded data being an encoded version of the original video signal obtained through inter-spatial resolution prediction using a high-resolution scaled-up video signal as a predictive signal and exhibiting a spatial resolution higher than the resolution-lowered video signal, the high-resolution scaled-up video signal being obtained by spatially scaling up a decoded signal through a high-resolution procedure based on the quantization parameter, the decoded signal being obtained through a decoding procedure to the resolution-lowered video signal, the quantization parameter being used in encoding the resolution-lowered video signal;

a first decoding program code of decoding the coded quantization parameter and decode the separated first coded data using the quantization parameter thus decoded to obtain the resolution-lowered video signal;

a reconstructing program code of spatially scaling up the resolution-lowered video signal to reconstruct the high-resolution scaled-up video signal based on the quantization parameter thus decoded; and a second decoding code of decoding the separated second coded data through inter-spatial resolution prediction using the reconstructed high-resolution scaled-up video signal as a predictive signal, thus obtaining a reproduced video signal of the same high spatial resolution as the input original video signal.

* * * * *